US006224816B1

(12) United States Patent
Hull et al.

(10) Patent No.: US 6,224,816 B1
(45) Date of Patent: May 1, 2001

(54) MOLDING METHOD, APPARATUS, AND DEVICE INCLUDING USE OF POWDER METAL TECHNOLOGY FOR FORMING A MOLDING TOOL WITH THERMAL CONTROL ELEMENTS

(75) Inventors: Charles W. Hull, Santa Clarita; Michael S. Lockard, Lake Elizabeth; Thomas A. Almquist, San Gabriel, all of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/156,512

(22) Filed: Sep. 17, 1998

Related U.S. Application Data
(60) Provisional application No. 60/079,847, filed on Mar. 27, 1998.

(51) Int. Cl.[7] ............................ B29C 33/04; B29C 33/38; B29C 33/40; B29C 35/08; B29C 41/02
(52) U.S. Cl. ........................ 264/401; 264/219; 264/221; 264/227; 264/308; 264/319; 264/328.16; 264/497; 264/603; 419/8; 419/27; 419/61
(58) Field of Search .................................. 264/40.6, 219, 264/221, 227, 308, 309, 328.16, 401, 497, 603; 419/8, 27, 61

(56) References Cited

U.S. PATENT DOCUMENTS

| | | |
|---|---|---|
| 3,823,002 | 7/1974 | Kirby et al. . |
| 3,929,476 | 12/1975 | Kirby et al. . |
| 4,327,156 | 4/1982 | Dillon et al. . |
| 4,359,435 | 11/1982 | Kogure . |
| 4,373,127 | 2/1983 | Hasket et al. . |
| 4,431,449 | 2/1984 | Dillon et al. . |
| 4,455,354 | 6/1984 | Dillon et al. . |
| 4,469,654 | 9/1984 | Hasket et al. . |
| 4,491,558 | 1/1985 | Gardner . |
| 4,554,218 | 11/1985 | Gardner et al. . |
| 4,844,144 | 7/1989 | Murphy et al. . |
| 4,923,672 | 5/1990 | Gladden et al. . |
| 5,507,336 | 4/1996 | Tobin . |
| 5,707,578 | * 1/1998 | Johnson et al. ...................... 264/401 |
| 5,849,238 | * 12/1998 | Schmidt et al. ...................... 264/401 |

FOREIGN PATENT DOCUMENTS 320811   6/1989   (EP) .

OTHER PUBLICATIONS

U.S. Patent Application Serial No. 09/096,963, filed Jun. 12, 1998, by Kris Schmidt, et al., and titled "Apparatus And Methods For Economically Fabricating Molded Refractory Articles Using Refractory Mix Displacing Elements".

U.S. Patent Application Serial No. 09/097,225, filed Jun. 12, 1998, by Michael S. Lockard, et al., and title "Apparatus And Methods For Fabricating Molded Refractory Articles".

Abstract of Japan 1–317718 (Dec. 22, 1989).
Abstract of Japan 3–253314 (Nov. 12, 1991).
Abstract of Japan 5–104589 (Apr. 27, 1993).
Abstract of Japan 5–200756 (Aug. 10, 1993).
Abstract of Japan 8–150437 (Jun. 11, 1996).
Abstract of Japan 9–11238 (Jan. 14, 1997).

* cited by examiner

*Primary Examiner*—Leo B. Tentoni
(74) *Attorney, Agent, or Firm*—Dennis Smalley; Ralph D'Alessandro; James Curry

(57) ABSTRACT

Tool having a molding surface is formed from a flowable material (e.g., powder material) wherein the shape of molding surface is formed from a molding process using a master pattern having a surface with a shape substantially the same as the shape of the molding surface to be formed. The tool has at least one thermal control element located within it and spaced from the molding surface where a component used in forming the thermal control element is located within the flowable material prior to solidifying the material. The powder material is preferably a mixture of metals. The thermal control elements include fluid flow paths, heating elements, temperature sensors, and the like.

14 Claims, 9 Drawing Sheets

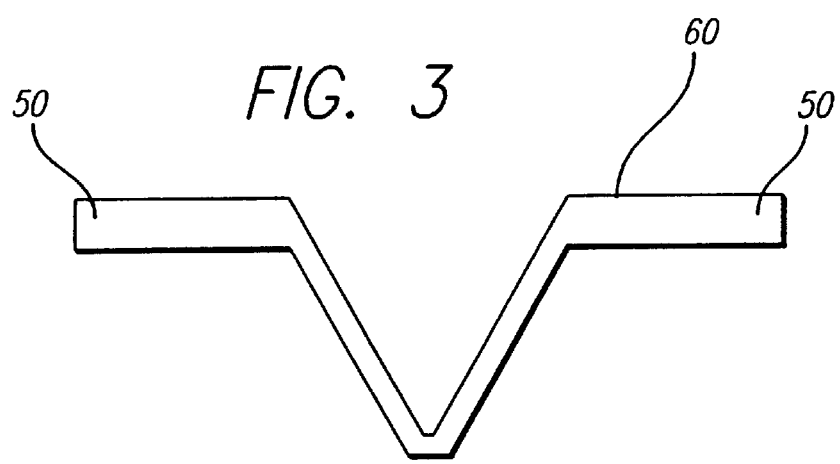
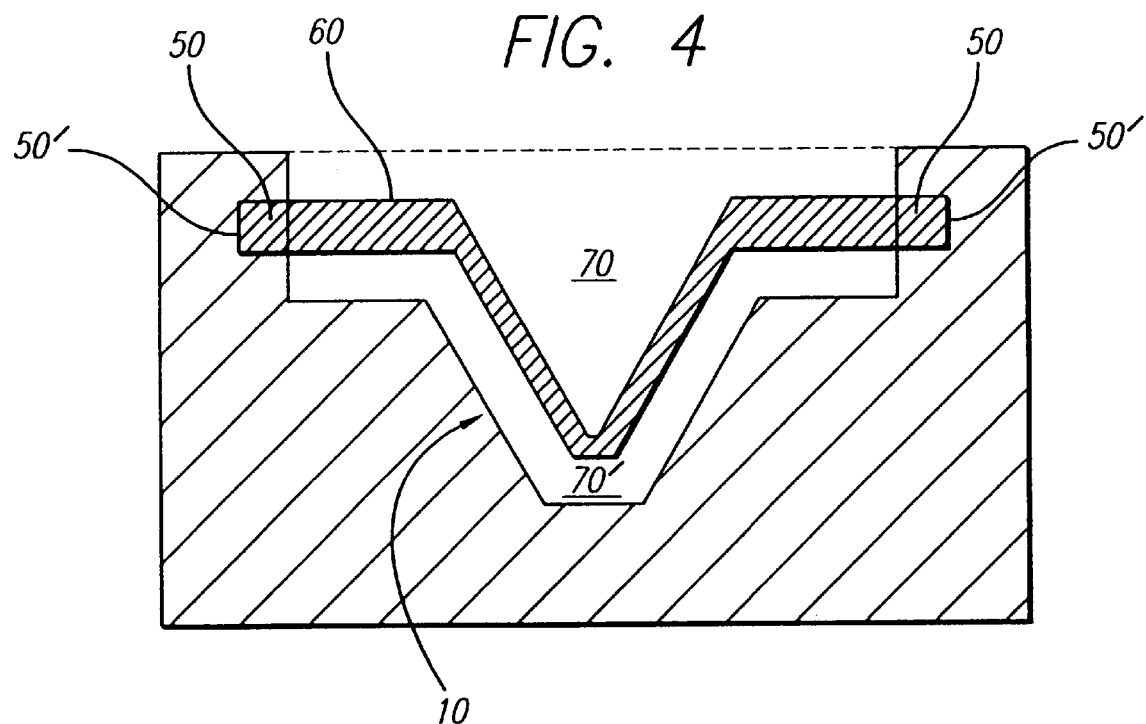

MOLDING METHOD, APPARATUS, AND DEVICE INCLUDING USE OF POWDER METAL TECHNOLOGY FOR FORMING A MOLDING TOOL WITH THERMAL CONTROL ELEMENTS

This application claims priority to provisionally filed application number 60/079,847, filed Mar. 27, 1998.

BACKGROUND OF THE INVENTION

1. Field of the Invention

This invention relates generally to the molding of objects and more particularly to the formation of molding tools using powder metal technology and more particularly to inclusion of thermal control elements in those tools.

2. Description of Related Art

Molding techniques are used to form many types of objects from many types of materials. These techniques have a common element of shaping the material to form the object by contacting the material with a molding surface, wherein the shape of the molding surface is transferred to the object material. This molding surface is a surface of a tool to be used in the molding process. At the time of shaping the object material is, in whole or in part, typically in a flowable state. Before separating the molding surface and the object material, the object surface transitions into a solid or at least a semi-solid state whereby it is no longer significantly flowable. This transformation may occur as a result of the surface of the object material cooling below its freezing point or solidus point. This process of using a reduction in temperature to cause the object material to transition between a first phase (e.g., flowable or liquid phase) to a second phase (e.g. solid phase) may be referred to as a thermal phase change molding process. Alternatively, this transition might occur by the object material undergoing a chemical reaction, to a sufficient extent, to cause it to solidify. As a further alternative, the transition might take place by a combination of these two techniques.

For these molding techniques to work, the molding surface must have appropriate properties, such as retaining its shape during the molding process and being separable from the object material. In some molding processes the molds are used only once then destroyed (e.g. investment or lost wax casting). In still further processes the tool is intended to retain its shape through the molding of tens, thousands, or even millions of copies of the object (e.g. injection molding and die casting).

As the latter process noted above involves the use of the same tool to successively produce copies of an object, the time it takes to form each copy can become a critical factor in the molding process. As such, it is typically desired that the molding time per copy (i.e. the cycle time) be as small as possible. Furthermore, as many such processes involve thermal phase changes to achieve the molding process, the time required to cool the material from its flowable state to its solid state is a critical factor in determining cycle time. The more heat conductive the tool and the more heat that can be removed from the tool per unit time, the faster the cycle time can be.

As such, molds for many fabrication methods are typically cooled to decrease the cycle times. Examples are plastic injection molding and die casting, where molten material is injected into the mold and the material must cool and solidify before it is ejected. The cycle time is the duration of time to inject the material, cool and solidify the material, open the mold, eject the part, and close the mold and be ready for the next injection. Currently mold inserts (i.e. the tool portion that includes the molding surface) and bases (i.e. an additional portion of the tool that holds the insert in position) are drilled, bored, or otherwise machined to produce passages for coolant flow (e.g. water or oil) or passages for insertion of other temperature control elements (e.g. heating elements). In particular when these passages are used for coolant flow, the method has allowed the heat from repeated molding cycles to be removed and has greatly reduced molding cycle times and speeded up fabrication of molded parts.

In addition to the need for cooling to improve cycle time, there are at least three other reasons why in some circumstances it might be desirable to control mold temperature by cooling and/or heating. Some materials and processes benefit from use of temperature control so as to minimize distortion of the copy of the object. It is also typical to control the temperature of the molding surface by heating and/or cooling to achieve acceptable surface finish. It is also typical that the mold surface be operated at a desired temperature and with a particular heat dissipation rate such that the flowable material will appropriately be distributed in the mold cavity prior to transition.

The typical process of machining passages into the tool is difficult, time consuming, costly and not always as effective as possible at minimizing cycle times and as effective as possible at producing objects with desired levels of accuracy. It is recognized, by those of skill in the art that the current methods of controlling the tool's thermal characteristics are not optimal. These thermal characteristics include passive characteristics such as thermal conductivity, convection, and radiative attributes of the tool shape and material. Some tools may have active thermal characteristics as well. These active thermal characteristics include such things as fluid flow within the tool and supplemental heating. Furthermore, some tools may have enhanced thermal characteristics as well. These characteristics may result from use of materials with increased thermal conductivity such as cooling pipes and the like.

The typical method of drilling passages does not typically provide the fastest cycle times possible, and it does not typically provide optimal active or enhanced thermal control across the face of the mold. In some circumstances optimal thermal control may involve active, enhanced, and/or passive uniform removal of heat from the molding face of the tool. In other circumstances, optimal thermal control might involve active, enhanced, and/or passive non-uniform heat removal from the surface. For example, if the surface element is near a large body of molding material, more heat may need to be extracted from that element than if the element were in proximity to a small volume of molding material. Optimal thermal control (i.e. temperature control and rate of heat removal) is an important requirement when uniform physical properties of the resulting molded material are important.

Typically the closer the cooling passages conform to the shape of the molding surface (ideally known as conformal cooling), the more uniform the temperature control and the rate of heat removal.

Also, as noted above, typical production of these passages has other disadvantages. The tools, especially the inserts, are typically made from very hard metal such as tool steel, thus making drilling or otherwise forming the passages difficult, costly, and time consuming.

Furthermore, these passage production operations produce straight flow paths within single pieces of the tool and may produce some step-wise curved paths where multiple pieces are brought together. This production of straight paths makes attainment of conformal cooling difficult, if not impossible.

A need exists in the art for easier and less costly production of cooling passages in tools. A further need exists for production of more optimal tooling, especially for tooling with more optimized control of mold temperature and heat flow within a tool.

Tooling production is described in "*Plastic Injection Molding . . . manufacturing process fundamentals*", by Douglas M. Bryce, which was published in 1996 as Volume 1 of a series entitled "Fundamentals of Injection Molding" by the Society of Manufacturing Engineers, Dearborn, Michigan. The entire disclosure of this publication is incorporated herein by reference as if set forth in full herein. In particular, this publication discloses main components of a molding machine on pages 11–27. Parameters associated with the molding process are addressed on pages 29–66. In particular, temperature control issues are addressed on pages 30–37. Optimization of mold parameters is addressed on pages 67–120. In particular, optimization of temperature is addressed on pages 78–93 wherein, among other things, cooling channels, cascades, and cooling pins are discussed. Pages 139–150 address basic issues associated with mold operation and design. Pages 195–218 address testing and failure analysis of the molded objects. Pages 219–253 address trouble shooting techniques for molding problems.

Production and use of tooling formed using powder metal technology are known in the art. Examples of techniques for such production and use are disclosed in the following U.S. Patents that are each herein incorporated by reference in their entirety:

(1) U.S. Pat. No. 3,823,002, entitled "Precision Molded Refractory Articles," issued July 1974 to Kirby et al.

(2) U.S. Pat. No. 3,929,476, entitled "Precision Molded Refractory Articles and Method of Making," issued December 1975 to Kirby et al.

(3) U.S. Pat. No. 4,327,156, entitled "Infiltrated Powdered Metal Composites Article," issued April 1982 to Dillon et al.

(4) U.S. Pat. No. 4,373,127, entitled "EDM Electrodes," issued February 1983 to Hasket et al.

(5) U.S. Pat. No. 4,432,449, entitled "Infiltrated Molded Articles of Spherical Non-Refractory Metal Powders," issued February 1984 to Dillon et al.

(6) U.S. Pat. No. 4,455,354, entitled "Dimensionally-Controlled Cobalt Containing Precision Molded Metal Article," issued June 1984 to Dillon et al.

(7) U.S. Pat. No. 4,469,654, entitled "EDM Electrodes," issued September 1984 to Hasket et al.

(8) U.S. Pat. No. 4,491,558, entitled "Austenitic Manganese Steel Containing Composite Article," issued January 1985, to Gardner.

(9) U.S. Pat. No. 4,554,218, entitled "Infiltrated Powdered Metal Composite Article," issued November 1985, to Gardener et al.

(10) U.S. Pat. No. 5,507,336, entitled "Method of Constructing Fully Dense Metal Molds and Parts," issued to Tobin.

The process of forming articles using powder metal technology, as described in the above patents, typically starts with a pattern of the tooling component (e.g. mold insert). This pattern may be formed with stereolithography or some other method. Then a temporary RTV (flexible material produced through a room temperature vulcanizing process) mold is cast around the pattern and the pattern is removed. Next a mixture of high melting point powder (e.g. metal and/or ceramic powder) and a binder is poured into the RTV mold, the binder hardens, and then the resulting "green" part is removed from the RTV mold. The green part is then heated in a furnace to remove the binder and to sinter the metal powder so that it is strong enough to handle. Typically the sintered component is not 100% dense. It is next heated in another furnace cycle where it is infiltrated with copper or another lower melting temperature metal to achieve full density and required mechanical properties. This mold insert has the desirable property that the infiltrated copper gives it higher thermal conductivity than an insert that is composed of 100% high melting temperature metal (e.g. A6 Tool Steel). Typically mold inserts formed with powder metal technology are drilled for cooling passages, as described previously.

Stereolithography and other Rapid Prototyping and Manufacturing technologies are described directly in the following U.S. patents and applications or indirectly through references incorporated therein by reference. The following listed patents and patent applications are fully incorporated herein by reference as if set forth in full:

U.S. Pat. No. 4,575,330, to Hull, describes some fundamental elements of stereolithography.

U.S. Pat. No. 5,321,622, to Snead et al., describes various techniques for manipulating three-dimensional object data to produce cross-sectional data for use in forming three-dimensional objects.

U.S. patent application Ser. No. 08/722,335 by Thayer et al. filed Sep. 27, 19996 now abandoned, and U.S. Pat. No. 5,943,235 to Ear. et al., respectively describe various issues related to the production of three-dimensional objects according to the principles of selective deposition modeling.

U.S. Pat. No. 5,965,079 to Manners, describes various techniques for solidifying layers of material sometimes known as build styles.

U.S. Pat. No. 5,902,538 by Kruger et al., discloses simplified exposure and coating techniques for forming 3D objects to overcome minimum coating depth limitations. Furthermore, this patent describes various RP&M technologies that can be used in the production of three-dimensional objects and supplies basic patent information associated with these various technologies.

The various RP&M technologies and some associated applications are described in the following two books which are incorporated by reference as if set forth in full herein: (1) *Rapid Prototyping and Manufacturing: Fundamentals of Stereolithography*, by Paul Jacobs, published by the Society of Manufacturing Engineers, Dearborn, Mich.; 1992; and (2) *Stereolithography and other RP&M Technologies: from Rapid Prototyping to Rapid Tooling*; by Paul Jacobs; published by the Society of Manufacturing Engineers, Dearborn, Mich.; 1996.

SUMMARY OF THE INVENTION

A first object of the invention is to provide an easier method for forming tooling with cooling passages.

A second object of the invention is to provide a less expensive method for forming tooling.

A third object of the invention is to provide tooling with improved thermal management.

A first aspect of the invention provides a method of forming a tool having a molding surface and a thermal control element. A master pattern is formed from a first material and the pattern has a first surface to be replicated. A component is located at a position spaced from the first surface and is used in forming at least one thermal control element. A powder material is placed adjacent to the first surface and at least partly embeds the at least one component. The powder material is solidified to form the tool, wherein the tool has a molding surface substantially replicating the first surface and the tool contains at least in part the at least one thermal control element.

A second aspect of the invention provides a reusable molding tool. The tool includes a body comprising integrally bonded particles of the powder material. The body includes a molding surface and a cavity is formed in the powder material prior to integrally bonding the particles, wherein the cavity is spaced from the molding surface.

A third aspect of the invention provides a reusable molding tool. The tool includes a solid body formed as a single piece. The body contains a flow path with at least one embedded section that follows a cured path. A molding surface is integral with the solid body.

A fourth aspect of the invention provides a molding method for forming a plurality of copies of an object, including the steps of: (1) providing a molding material in a flowable state; (2) providing a cavity with a shape corresponding substantially to a shape of the object to be formed; (3) inserting the molding material into the cavity; (4) solidifying the molding material to form a copy of the object; (5) opening the cavity and removing the copy of the object; (6) closing the cavity, after removing the copy of the object, in preparation for forming a next copy of the object; and (7) repeating steps (3), (4), (5), and (6) a plurality of times to form the plurality of copies of the object. The cavity at least in part includes a molding surface of a tool. The tool has a body including integrally bonded particles of a powder material. The body includes a region comprising a thermal control element wherein the region, at least in part, is formed in the body prior to integrally bonding the particles, and wherein the region is spaced from the molding surface.

A fifth aspect of the invention provides a molding method for forming a plurality of copies of an object, comprising the steps of: (1) providing a molding material in a flowable state; (2) providing a cavity with a shape corresponding substantially to a shape of the object to be formed; (3) inserting flowable molding material into the cavity; (4) solidifying the molding material to form a copy of the object; (5) opening the cavity and removing the copy of the object; (6) closing the cavity, after removing the copy of the object, in preparation for forming a next copy of the object; (7); and, repeating steps (3), (4), (5), and (6) a plurality of times to form the plurality of copies of the object. The cavity at least in part comprises a molding surface of a tool, the tool having a body including a thermal control element and a temperature sensor and wherein the thermal control element is controlled in response to the temperature sensed by a sensor.

A sixth aspect of the invention provides a method of forming a tool having a molding surface and containing a fluid flow passage. The method includes supplying an initial pattern having a first surface to be replicated. The method also includes locating at least one removable component, at a position spaced from said first surface. The flowable material is placed adjacent the first surface and at least partially embeds the at least one component. A flow passage is formed, at least in part, by removing the component. The flowable material is solidified, such that the tool is formed with a molding surface substantially replicating the first surface and wherein the tool contains the fluid flow passage.

A seventh aspect of the invention provides a method of forming a tool including a passage formed therein. The method includes supplying an initial pattern having a first surface to be replicated. A component is located at a position relative to the first surface. A flowable material is placed adjacent the first surface and at least partially embeds the at least one component. The flowable material is solidified and the component is removed to yield a passage within the tool. The tool is formed with a molding surface substantially replicating the first surface.

An eighth aspect of the invention provides a method of forming a tool blank having a passage located therein. A cavity having sides and a bottom surface is supplied. A removable component is placed in the cavity. A flowable material is placed adjacent the bottom surface and at least partially embeds the component. The flowable material is solidified and the at least one component removed to yield a passage in the tool.

A ninth aspect of the invention provides a method of forming an object having a passage located therein. The method includes supplying a cavity having at least one side structure and a bottom surface. It further includes locating at least one removable component at a position in the cavity. It also includes placing a flowable material adjacent the bottom surface and at least partially embedding the at least one component. The flowable material is solidified and the at least one component is removed.

Other aspects of the invention provide apparatus counterparts to the method aspects noted above. Still other objectives and aspects of the invention will be appreciated by those of skill in the art upon review of the teachings herein. It is intended that the objects and aspects of the invention disclosed herein be pursued and practiced individually as well as in various combinations, some of which are explicitly disclosed, others of which will be apparent upon review of the teachings herein when taken as a whole.

BRIEF DESCRIPTION OF THE DRAWINGS

FIG. 3. Flow passage component formed with SDM including core alignment pins.

FIG. 4. Temporary flexible mold with fluid flow passage component in place, ready to pour metal powder and binder mixture.

DETAILED DESCRIPTION OF PREFERRED EMBODIMENTS

Embodiment No. 1

Figure 1:
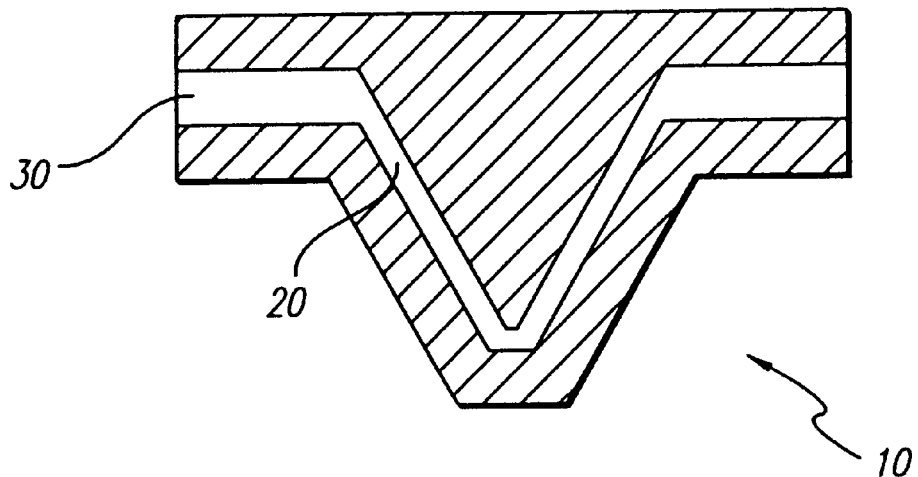
FIG. 1. Mold design with fluid flow passage.

In a first preferred embodiment, tools for molding, and particularly an insert portion of those tools, are formed using powder metal tooling technology according to standard practices with necessary modifications to add at least one component that will be used in forming at least one thermal control element. This at least one component is added, at least in part, prior to solidification of the powder as opposed to being inserted by boring, drilling, or other machining operation after solidification of the powder. The process used in this first embodiment proceeds according to the following steps:

(1) A pattern is received having a first surface substantially corresponding to a molding surface of the tool to be produced.

(2) A temporary or intermediate mold is cast around the pattern and the pattern is removed from the mold. This mold has a second surface substantially corresponding to the molding surface to be produced.

(3) At least one component is inserted into the temporary mold. Either before or after beginning to fill the mold with a powder material, the component is inserted into the mold. This component is spaced from the second surface according to a desired spatial relationship such that the powder material separates the component from the second surface and such that the component is substantially or completely surrounded by the powder.

(4) After filling the mold, the material is transformed to an adhered mass to form an unfinished tool or part. This unfinished tool or part is typically called a "green" tool or part. This green tool has a third surface substantially corresponding to the shape of the molding surface.

(5) The green part is removed from the mold. Optionally, the components may be removed.

(6) After removal from the mold, the green part is then heated in a furnace to sinter or otherwise integrally bond the particles of the powder material together so as to produce a fired part.

(7) The fired part is typically heated in another furnace cycle where it is infiltrated with a material that is in a flowable state. This material has a melting point lower than that of the powder particles. The part at this stage might be called an infiltrated green part and what was the third surface, may now be considered the preliminary molding surface.

(8) If not already done in step (6) or (7), the component may be removed from the infiltrated green part to yield one or more passages or internal cavities for use in forming thermal control elements within the body of the infiltrated part. Alternately, if the component was intended to be the physical thermal control element, as opposed to a placeholder for it, the component may remain in place. The thermal control elements may be of an active type or simply of an enhanced type.

(9) A number of additional steps may be taken to complete the formation of the tool for use in a molding process. For example, further preparation of passages to function as thermal control elements may occur. Further shaping of the tool surface may be performed to bring the tool surface to its final shape. Electrical connections to heating elements or temperature sensors might be added or completed; fluid flow connections might be completed. A base or other holding/registration device might be affixed to the tool to ready it for use in a particular molding process.

(10) The tool may be put to its intended use. For example this intended use might be as a portion of a cavity for injection molding or for die-casting. In this example, the tool will be used to produce multiple copies of a desired object. These copies may be called molded parts or molded objects.

Before turning to a more detailed discussion of the above ten steps and their numerous enhancements and alternatives, the following examples are discussed to give further clarity to some of the above steps.

In a first example, if the thermal control elements are to be fluid flow passages, the shape of the passages can be designed for optimum cooling to minimize cycle time and/or to maximize temperature uniformity across the molding surface. The difficult and time consuming drilling process of the typical approach is wholly or at least substantially eliminated. The cooling passage is formed using the following steps. A pattern core that represents the shape and volume of the cooling passage is produced from a durable low melting material, such as wax. This core pattern is inserted into the temporary flexible mold (e.g. RTV mold) and fixtured into place so that the volume of the passage pattern displaces the region in the mold where the cooling passage is to be located. Next the mixture of high melting point metal powder and binder is poured into the mold and around the cooling passage core pattern. After the binder hardens and the "green" component is removed from the RTV mold, the core pattern for the cooling passage is then removed from the "green" component by heating above its melting point and pouring it out. Any residual core pattern material is removed in one of the subsequent furnace cycles.

As a further example, a desired mold may be designed using a three-dimensional CAD/CAM system. The design may be optimized with the aid of material flow analysis software (e.g. software as sold by C-Mold of Louisville, Ky.). This design can include consideration of mold temperature such as controlled by internal conformal cooling passages. The desired mold design is then separated into the required components, and the components are fabricated and assembled to produce the mold. The data for the mold inserts may be separated into the outside geometry and the geometry that represents the volume of the passage to be inserted. The pattern for the mold geometry may be produced with stereolithography (SL), and core patterns for the passage may be produced with selective deposition modeling (SDM), such as multi-jet modeling (MJM), as commercialized in the Actua 2100 modeling system sold by 3D Systems, Inc. of Valencia, Calif. Alignment pins may be added to both patterns. The addition of alignment pins to the passage adds protrusions thereto. The addition of alignment pins to the cavity master will result in protrusions on this master but will result in indentations on the RTV mold that will be produced therefrom. These indentations may act as registration features for ensuring that the core position is properly matched to the surface of the RTV mold that will eventually be converted into a molding surface on the tool. This use of designed-in alignment features ensures that the core (i.e. the passage) can be accurately and easily positioned in the RTV mold. Both sets of patterns may be produced directly from the CAD/CAM design data. This latest example is illustrated in FIGS. 1–4. FIG. 1 depicts a side view of a vertical cross-sectional cut through a tool designed-in CAD. This tool includes a molding face or surface 10, a fluid-flow passage 20, and flow direction 30 of a fluid through the passage.

Figure 2:
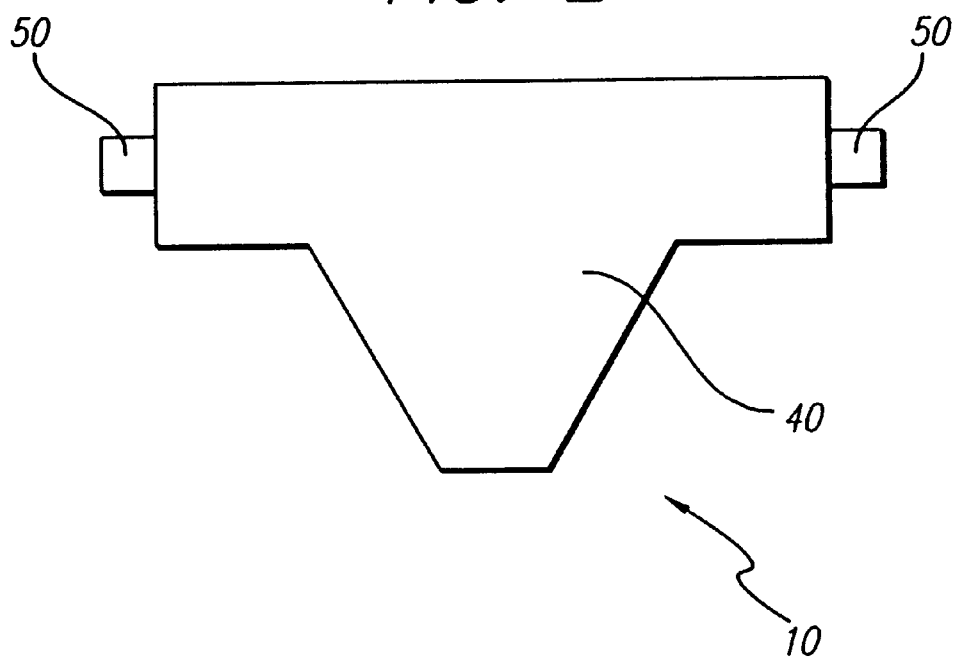
FIG. 2. Stereolithography pattern of outside geometry, with core alignment pins.

FIG. 2 depicts an object 40 formed from stereolithography corresponding to the shape of the tool, including molding face 10 with the exception that alignment notches 50 have been added to either side of the object.

FIG. 3 depicts the component 60 from which a fluid flow passage will be generated. This component 60 has been produced on an SDM system and matches the desired CAD design of the passage with the exception of the alignment pins 50 added thereto.

FIG. 4 depicts a RTV mold formed from the object of FIG. 2, including molding surface 10, and alignment indentations 50' formed from alignment pins 50. FIG. 4 also depicts component 60 inserted into the RTV mold with pins 50 being inserted into indentations 50' so that the passage is appropriately aligned with the molding face or surface 10. The next step not shown would be to fill region 70 including 70' with powder material and thereafter transforming the powder material to a cohesive mass to form the green part and thereafter following the remaining steps in the process to complete formation of the tool.

Numerous enhancements and alternatives to the first embodiment exist. These alternatives along with a more detailed description of the ten steps of the above process are described herein next.

Further Details of the First Embodiment and Exemplary Alternatives

Step 1:

One or more patterns are received with surfaces substantially corresponding to at least one surface of the copies of the object to be molded (i.e. molded objects or parts) from the tool that is to be formed. The surfaces of these patterns, that are to be transferred to the molded parts, may be called "first" surfaces. These patterns may not have first surfaces identical to the corresponding surfaces of the molded parts. Furthermore, these patterns may not have first surfaces identical to the corresponding surfaces of the tool being formed.

These differences might result from a number of causes. These causes, for example, might include taking into account any sizing differences (e.g. shrinkage or expansion) that may occur when forming the tool from the initial pattern. These causes might include taking into account any sizing differences (e.g. shrinkage or expansion) that may occur when forming the molded parts from the tool. Additionally, these causes might include taking into account any distortion or warpage that might result in the molded parts not precisely replicating the surfaces of the tool.

Furthermore, these causes might include taking into consideration that it may be desirable to modify, slightly or extensively, the surfaces of the tool prior to using it in a molding process. Such modifications might arise when the original pattern approximates but imprecisely represents the shape of the object (i.e. the pattern may be considered to be "near net shape"). Such need for modifications might arise when the tool is produced from an original pattern that included stair step discontinuities commonly associated with producing patterns on a layer by layer basis. Such modifications might also arise in a situation where additional surface features need to be added as a result of the original pattern only including a portion of the actual surface features. The included features of the original pattern might be of the net shape or near net shape type. The shape modifications might be added to the tool through the use of various machining operations including the use of electrical discharge machining (EDM).

In this first step it is assumed that an initial pattern is supplied having a desired first surface shape. However in an alternative embodiment, the first pattern may be that of a blank. The blank may have any desired bulk shape. For example, it may be cylindrical in nature or rectangular. It may have a planar surface that will be shaped later or a surface of some other initial shape. In this alternative, blank tooling pieces can be formed with a desired configuration of internal passages or cavities and any desired surface configurations can be added later. The configuration of these passages or cavities may be standardized according to one or more predefined patterns. Alternatively, the passages may be added in a tailored manner according to the surface configuration that will eventually be applied to the surface of the piece.

These initial patterns are preferably produced by stereolithography, but any other technique for forming the patterns may be acceptable. For example, the pattern may be formed according to other RP&M techniques such as selective deposition modeling (SDM), laminated object manufacturing (LOM), selective laser sintering (SLS), or the like. Further examples of forming patterns include casting, machining; carving; cutting; stacking; or bonding laminae to build up the pattern; or otherwise forming by hand.

Figure 5A:
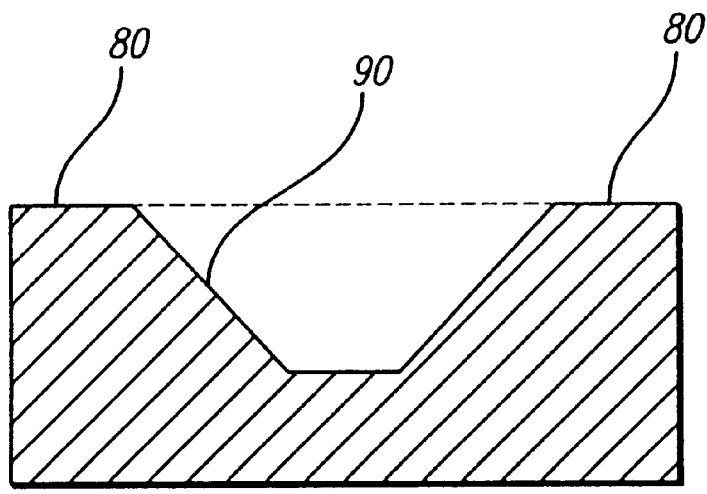
FIGS. 5a and 5b depict side views of initial patterns that include, respectively, indented and protruding regions.
Figure 5B:
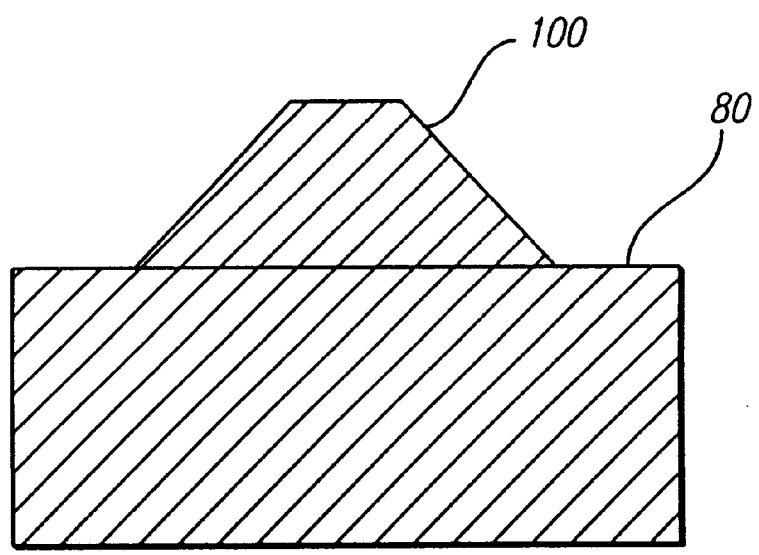

The desired patterns may consist primarily of indentations as compared to a surrounding perimeter of the pattern (sometimes called "cavities") or primarily of protrusions extending from a surrounding perimeter of the pattern (sometimes called "cores"). To illustrate these points, FIGS. 5a and 5b depict side views of patterns having surrounding perimeters 80. FIG. 5a includes an indented surface 90, while FIG. 5b illustrates a protruding surface 100.

Figure 6A:
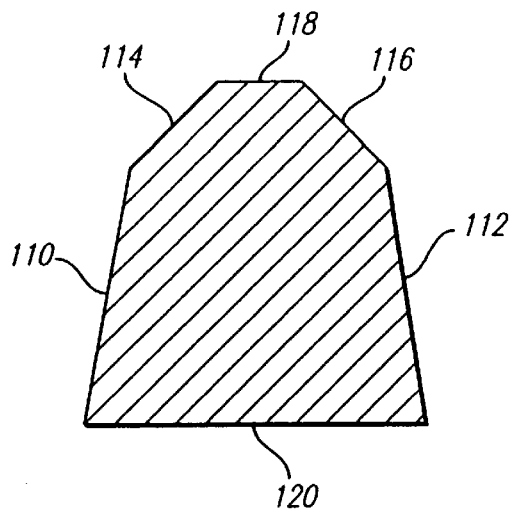
FIG. 6a depicts a side view of a pattern having surfaces to be replicated.
Figure 6B:
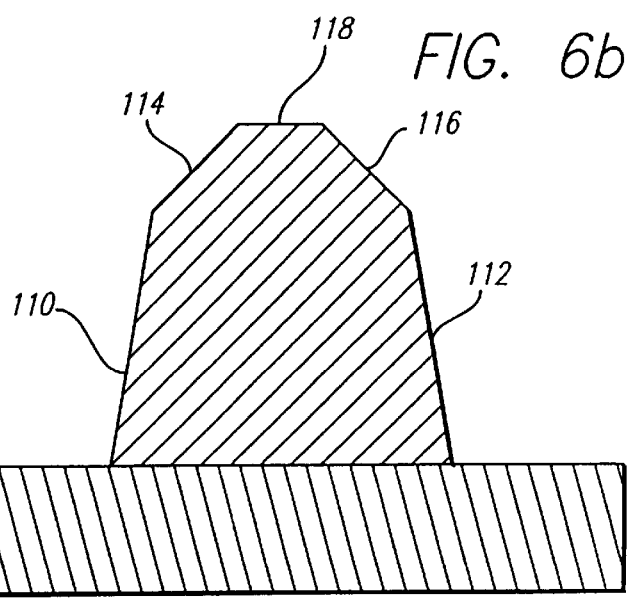
FIG. 6b depicts a side view the pattern of FIG. 6a with a base added thereto.
Figure 6C:
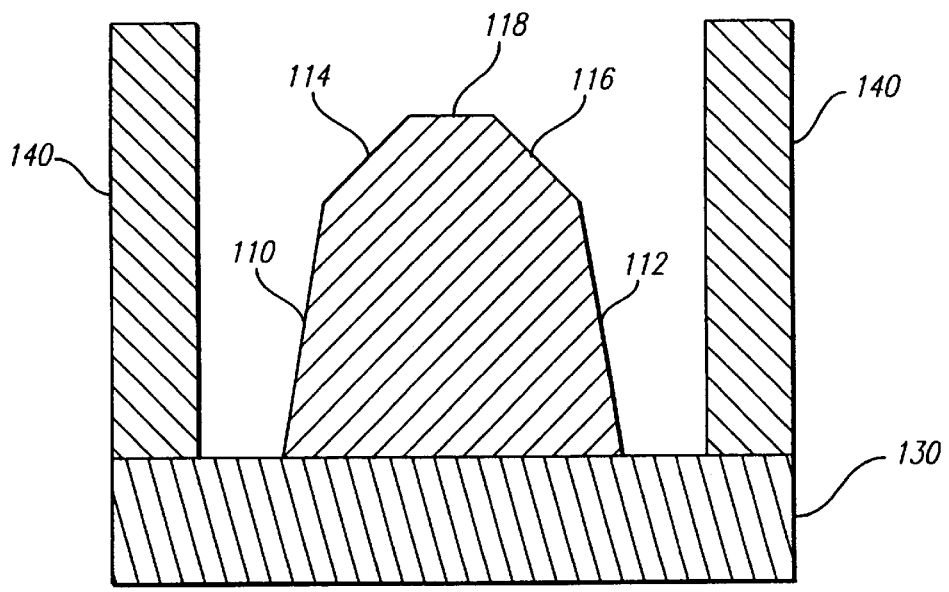
FIG. 6c depicts a side view of the pattern of FIG. 6b with side structures added thereto.

Depending on how the patterns will be used in the remaining steps, and alternatives thereto, it may be desirable to add additional surfaces that more or less surround the pattern. These additional surrounding surfaces might be part of one or both of a base and side walls. These additional surfaces may be useful in subsequent steps where it may be useful to treat the initial pattern as a mold cavity. These additional surrounding surfaces may be formed along with the pattern in a stereolithographic process, or the like, or alternatively may be formed in some other manner and added subsequent to the formation of the object. An illustration of an object along with these extra surrounding surfaces is provided in FIGS. 6a, 6b, and 6c. FIG. 6a illustrates a pattern having first surfaces 110, 112, 114, 116 and 118 to be replicated while surface 120 is not of interest. FIG. 6b adds a base element 130 to the pattern of FIG. 6a. FIG. 6c adds side walls 140 to the pattern and base of FIG. 6b.

In an alternate, the initial patterns may not be new but instead they might be existing patterns such as previously formed tool surfaces that need to be reformed in a different material or alternatively in a situation where an additional copy of the tool is needed.

Stereolithography and selective deposition modeling equipment useful in forming the patterns used in this first step are sold by 3D Systems, Inc. of Valencia, Calif., under the names SLA and Actua, respectively. Several SLA models of different sizes exist including the SLA-250, SLA-3500, and the SLA-5000, one model of the Actua system exists which is the Actua 2100. The stereolithography systems produce models with photoset materials (i.e. liquid photopolymer materials) while the Actua modeling system produces models from thermoplastic materials. Preferred patterns may be formed with the ACES build style, QUICKCAST build style (both discussed in U.S. Pat. No. 5,965,079 to Manners) or the tooling build style (discussed in U.S. Pat. No. 5,902,538 to Kriger, et al.).

Objects produced with most RP&M systems, including stereolithography, typically exhibit stair step surface discontinuities between the individual laminae that form the object. In other words, the patterns produced directly by stereolithography may only be of the near net shape type. Prior to moving to subsequent steps of the process, it may be desirable to remove these discontinuities from some or all of the first surfaces of the pattern. In alternates, it may be preferred to forming tool first then remove the discontinuities.

This removal process may take a number of different forms. For example, it may take the form of machining off (e.g. sanding off) or filling in these discontinuities before proceeding to further steps. Both protruding and indented features may be smoothed prior to proceeding to a next step. Alternatively, as protruding features may be easier to accurately smooth than indented features, it may be desirable to only smooth these features at this stage of the process. In a later step when a pattern orientation reversal occurs (indentation becomes protrusion vice-a-versa) it may be possible to more easily smooth the originally indented features which have now become protrusions. If some features are smoothed with one pattern orientation and other features are to be smoothed when that orientation is reversed, it may be desirable to reverse the type of smoothing technique from that which was originally used (e.g. machining becomes filling or vice-a-versa).

For optimal accuracy in forming tools the technique for smoothing discontinuities should be correlated to whether the original pattern was formed in an undersized or oversized manner. The formation of oversized and undersized objects is discussed in U.S. Pat. No. 5,321,622. Examples of stair steps, pattern orientation, smoothing, and pattern reversal are illustrated in FIGS. 7a–7e.

Figure 7A:
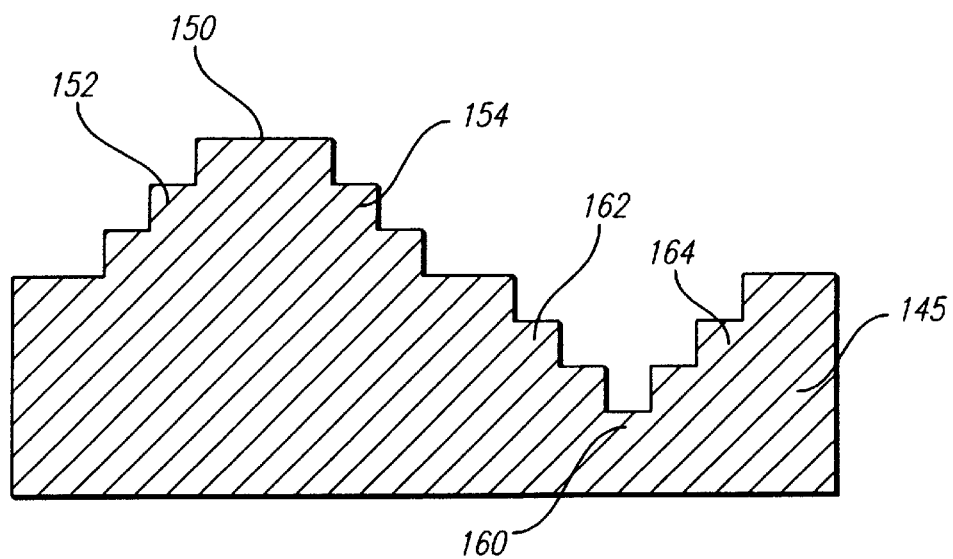
FIG. 7a depicts a side view of a near net-shape pattern including a protrusion and an indentation where the pattern exhibits stair step discontinuities.
Figure 7B:
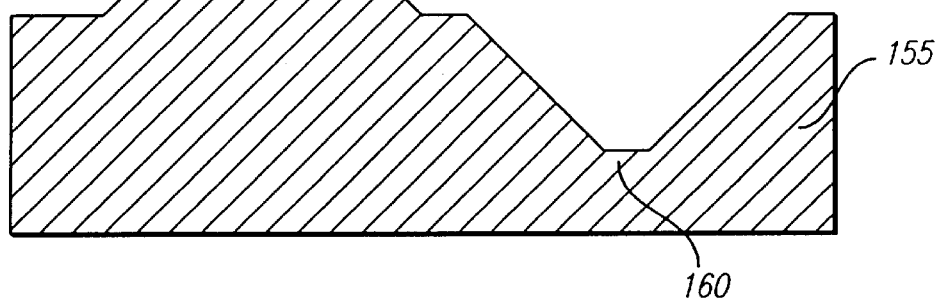
FIG. 7b depicts a side view of a net shape pattern corresponding to the pattern of FIG. 7a with the stair step discontinuities removed.

FIG. 7a depicts an original pattern 145 including a first surface with protruding portion 150 and indented portion 160 as produced from a layer-by-layer, build-up process. These protruding and indented portions exhibit the typical stair step discontinuities 152, 154, 162, and 164 that result from layer-by-layer production of the pattern. FIG. 7b, on the other hand, depicts the pattern 155 in its desired configuration, including protrusion 150' and indentation 160' without stair step discontinuities. The first surface of FIG. 7a may be considered as near net shape while the first surface of FIG. 7b may be considered net shape.

Figure 7C:
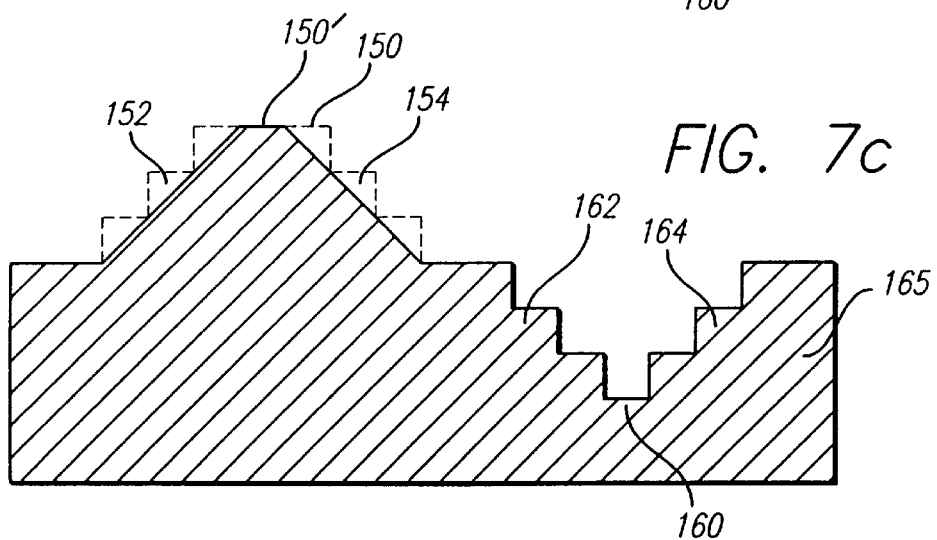
FIG. 7c depicts a side view of the same pattern as FIG. 7a with stair step discontinuities removed from the only the protruding surface.

FIG. 7c depicts the pattern of FIG. 7a with the discontinuities 152 and 154 smoothed from protrusion 150 resulting in protrusion 150'. These discontinuities have been smoothed by a machining operation such as sanding. As discontinuities 162 and 164 are part of an indentation, they have not been removed yet. As a result of the smoothing operations, the resulting pattern 165 depicted in FIG. 7c is partially net shape and partially near net shape.

Figure 7D:
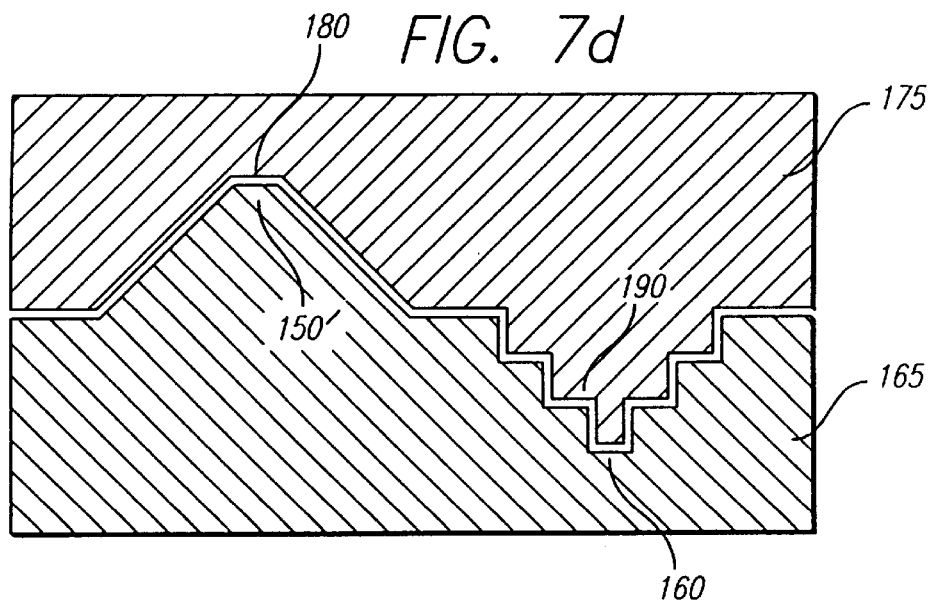
FIG. 7d depicts a side view of the result of a molding operation where a reversal of the pattern of FIG. 7c is made.
Figure 7E:
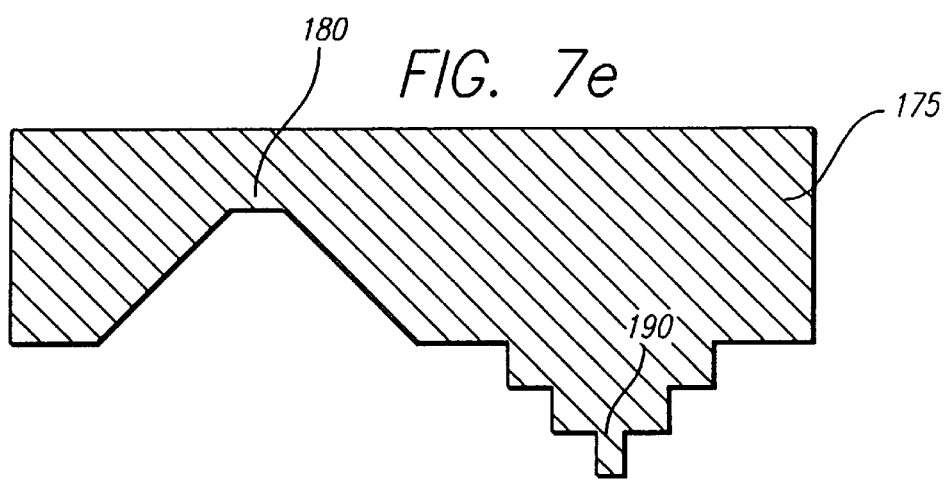
FIG. 7e depicts the reversal pattern of FIG. 7d separated from the original pattern.

FIG. 7d depicts a molding operation where a reversal pattern 175 of pattern 165 is made. More particularly, FIG. 7d depicts the reversal of protrusion 150' to become indentation 180 and the reversal of indentation 160 to become protrusion 190. FIG. 7e depicts pattern 175 separated from its originating surface.

Figure 7F:
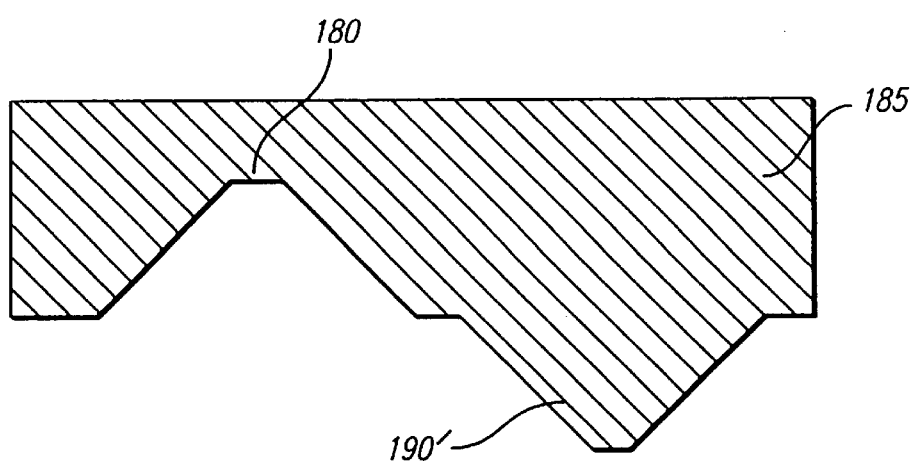
FIG. 7f depicts the pattern of FIG. 7e with the protrusion smoothed, wherein the net shape pattern results.

FIG. 7f depicts resulting pattern 185 that is obtained by smoothing region 190 of pattern 175 to obtain region 190'. As far as surface discontinuities are concerned, region 190 is a net shape pattern. It is preferred that region 190 be smoothed by filling instead of by removal so that the object accuracy is optimally retained, though in some circumstances smoothing by removal may be acceptable. The reason for the preferred reversal in smoothing technique is directly related to the reversal in the pattern orientation.

Step 2:

In this step, a mold is formed around the initial pattern. This may be considered an intermediate molding step in the process of producing the final tool. The use of an intermediate molding process results in the surface of the original pattern being only indirectly responsible for the molding surface of the tool produced using the powder material. The surface of this intermediate mold that receives the first surface from the original pattern may be called the second surface. This mold is preferably flexible to aid in its removal from the original pattern and to aid in its removal from the green part that will be formed in a subsequent step. This flexible mold is preferably formed in a silicone room temperature vulcanizing (RTV) molding process. Those of skill in the art know the RTV molding process. It should be noted that a single application of this intermediate-molding step results in the reversal of the orientation of the first surface of the original pattern. In other words, an original indented surface will become a protruding surface and an original protruding surface will be come an indented surface. When a single intermediate molding step is used, the surface orientation of the originally supplied pattern and that of the tool will be the same.

A first alternative to this step might involve the formation of an intermediate mold that is not flexible. This mold might be formed from any material that can be separated from the original pattern and which can eventually thereafter be separated from any further intermediate molds that may be formed or from the green part to be produced in the third step.

A second alternative might utilize more than one intermediate molding process. For example, two intermediate molding processes might be used. As noted above, the first use reverses the original pattern orientation while the second use will reestablish the original pattern orientation. If a second mold (as produced according to this step) is used as the starting point for the third step, the surface orientation of the original pattern and the green tool will be reversed. In other words, if two intermediate molding steps (or any even number) are used, the first surface of the original pattern must possess the opposite surface orientation, as that desired in the tool.

A third alternative might completely eliminate this second step. In this alternative, the first surface of the original pattern would be used in directly shaping the third surface of the green part. In this alternative the original pattern must possess the opposite surface orientation as that of tool formed from the powder material.

In some circumstances, it may be desirable to apply a release agent or other surface treatment to the original pattern, especially the first surface, prior to using it in a molding pattern.

Step 3:

In the third step two things happen: (1) a component is added to the intermediate mold, and (2) the intermediate mold is filled with a powder material. The component is spaced from the second surface of the intermediate mold and becomes substantially embedded in the powder material. The position of the component is set according to a desired spatial relationship with the molding surface. Its position may also be based on a desired, or at least workable, spatial relationship with other surfaces of the tool.

Various powders may be used in this embodiment including thermoplastic, thermoset, metal, and ceramic powders. Examples of such powders are wax, steel, tungsten, nickel, tungsten carbide, and the like. Other materials might include mixtures of metal powders, mixtures of ceramic powders, and combinations of metal and ceramic powders. Such mixtures might include combinations of tool steel (such as A6) and tungsten carbide. Other materials of use in the present invention are disclosed in the previously referenced powder metal technology patents.

Powder based thermoplastic materials, thermoset materials, and some metals may be used as binders to temporarily bind particles of higher melting temperature powder components together prior to the eventual sintering thereof. For a metal to be used as a binder, it is preferred that it have a melting temperature less than that of the melting temperature, or a degradation temperature, of the intermediate mold. Alternatively, liquid based materials may be used as binders. These materials may, for example, be of the thermoplastic or thermoset type.

A thermoplastic material might be a wax that is elevated to a temperature sufficient to make it flowable. It may be mixed with a desired powder, after which the heated combination may be added to the intermediate mold. When the mixture cools, the green part is formed. A thermoset material might involve a multi-component polymerizable substance that is self-polymerizing when all components are mixed and/or that solidify in response to heating. In the case where elevated temperatures are used in the process of filling the intermediate mold or in the process of curing the material that is in the mold, it is preferred that the component(s) and mold be capable of surviving the elevated temperatures.

In one alternative, material is added to the intermediate mold in stages. In a first stage a portion of the material is added over the second surface, after which at least one component may be inserted into the intermediate mold at its desired location relative to the second surface and possibly to the other surfaces that will become part of the tool. More material may than be added to the mold in a continuous filling manner or continued step-wise manner until the mold has been filled. In another alternative at least one component is inserted into the intermediate mold prior to adding any material thereto. During filling of the intermediate mold with the material, the mold may be subjected to heat, vibration, centrifugal forces, vacuum, or other stimulus to aid in the process of getting the mold completely filled.

When using some molds, components, and some filling materials, it may be advantageous to apply a release agent to the mold, especially the second surface, and/or components prior to adding the fill material.

In a further alternative, it may be possible to bypass completely the formation of a green part. This may be accomplished by directly fusing, sintering or otherwise integrally binding the powder particles. The powder may remain in contact with the second surface of the intermediate mold or even in contact with the first surface of the original pattern.

In other alternatives and/or as enhancements, it is preferred that techniques be used to hold the component(s) in appropriate registration during addition of and curing of the powder material. In this regard it is also preferred that the at least one component have a portion that extends outside powder the material. This portion may be appropriately secured to ensure registration. This extension of the component outside the mixture might involve locating dimples or indentations at various locations on the mold surface but typically not at the second surface.

Other notching techniques may be used that do not precisely match the configuration of the extended part of the component. These other notching techniques might involve use of larger indentations than the size of the component along at least a one dimension. In one alternative, if the opening in the intermediate mold is facing upward, a vertical notch may be formed in the intermediate mold to extend from the upper edge of the mold side wall down to the location where the component is to be located. Notches of this type might be called sliding notches as it is intended that the component be moved to its desired location by having its extension slide along the notch. Such notches may be used on one or more side walls where a component extension is to be located. If the component has extensions on opposite ends and if the mold is provided with sliding notches on both sides, the component may be simply slid into place. On the other hand, if a component has two extensions on opposite ends and if the mold is provided with one sliding notch and one more precisely fitted notch, the component may be moved into its desired position by first fixing one end into the more precisely fitted notch whereafter the other end may be moved into position by sliding.

Figure 8A:
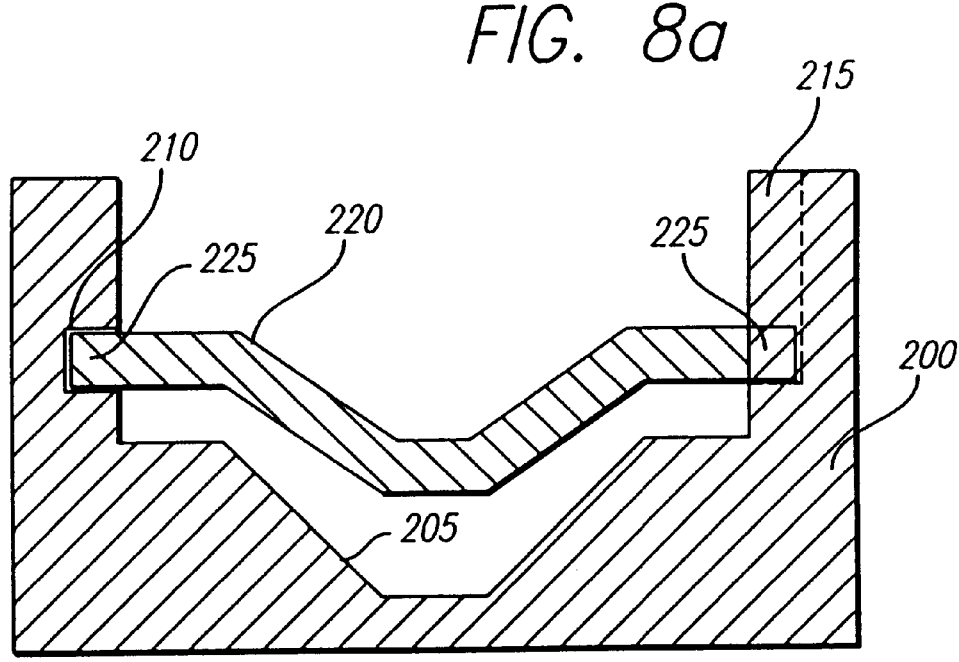
FIG. 8a depicts a side view of an intermediate mold into which a component has been inserted.
Figure 8B:
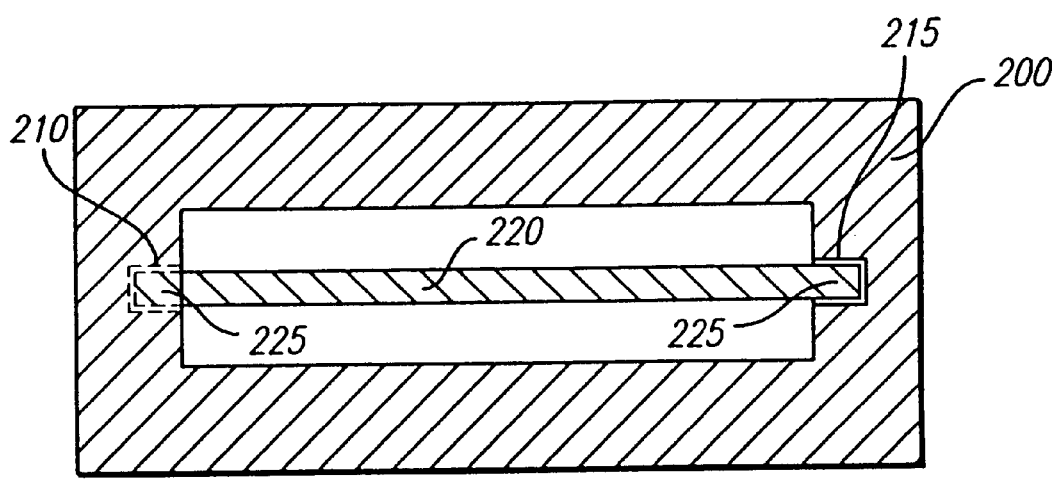
FIG. 8b depicts a top view of the same mold as shown in FIG. 8a including the inserted component.

This latter approach of locating the component into place is illustrated in FIGS. 8a and 8b. FIG. 8b depicts a side view of intermediate mold 200, including molding surface 205, fitted notch 210, sliding notch 215, and component 220 with extensions 225. FIG. 8b depicts a top view of the same mold as shown in FIG. 8a. It is believed that any filling of the sliding notch with material that will eventually be cured can be readily machined off at an appropriate time.

In an alternative approach, undesired filling of the notches may be eliminated or at least significantly reduced, by filling the notches with a patching material that can be separated from the green or fired part. This patching material might be the same material that forms any removable components that are to be placed in the mold. Alternatively, this patching material may be made of the same material as the mold. If the notch has been cut into the mold and an associated piece removed from the mold, the piece or a portion of it may be used as the patch. The patch may be bonded to the mold to ensure that it remains in place or alternatively it may be held into place by powder material that will be packed against it.

In the former approach where the object is slid into place, it is possible to include a rotational motion at the end of sliding to help lock the component into place. The alternate may be particularly useful when the notch width matches or is slightly smaller than the component extension width when properly aligned, but is larger than the component extension width when the component is in a rotated position.

It is preferred that three or more non-colinear locations along, or extending from, the component contact the walls of the mold. These multiple locations may be used to register the component and mold in their desired relative positions.

In another alternative, the component may be simply butted up against the mold such that little or none of the material becomes located between the component and the mold. The uncovered component portions resulting from extending beyond the fill region or butting against the mold walls may eventually become entrance locations and/or exit locations for passages formed by the component. In some situations one or more of these uncovered portions may eventually be plugged. If the at least one component is fully embedded in the mixture, after the mixture is solidified, a minor drilling or machining operation may be used to expose the component or a passage remaining after destruction of the component.

In an alternative the approach, the component may be held in registration during filling and curing by using at least one rod or wire, and more preferably a plurality of rods or wires. The rods may be held in position by mounting them to a fixture located in proximity to the back of the mold. If the passages are to become flow paths by eventual removable of the component, it is preferred that these rods or wires be solid and be composed of a material that can permanently become part of the tool. After the powder is solidified, if desired, any excess length protruding from the back or sides of the tool may be removed.

In an alternative approach the component may be held in registration during filling and curing by use of screen like meshes to locate at least one of a lower extent or an upper extent of the component relative to the molding surface. These meshes may be made of any appropriate material, preferably a material that will remain in the metal and ceramic mold after formation such as steel or the like. Examples of such materials include wires and rods. The mesh spacing should be large enough to allow the powder material to pass through but small enough to support the component at preferably multiple locations. Preferred mesh sizes range from approximately 0.25 inches to approximately 1.0 inch. These meshes will have a maximum outer dimension. If the mesh is circular, this dimension may be a diameter. Alternatively, if the mesh is elliptical or oval the dimension may be a major axis. If the mesh has some other shape, the dimension may be a length and/or width that is larger than a corresponding inner dimension of the intermediate mold cavity. If this mesh dimension is larger than an inner mold dimension, the mesh may be fixed in the mold by friction or by having some of its elements protrude into the sides of the mold. The meshes may extend completely through the mold or they may have their interior portions removed so as to allow portions of the component to extend above or below the plane of the mesh. Of course three-dimensional meshes may also be used. It is preferred that upper and lower meshes be used in defining the component position. It is possible that the horizontal dimensions of the component be fixed in position, as well as the vertical extents, by wiring the component to a lower and/or upper mesh. It is furthermore possible to locate multiple components using a single mesh or pairs of meshes.

The components utilized in this step may be solid, hollow, or partially hollow. If the component is hollow or partially hollow, it is preferred that any openings in the component be plugged (i.e. the component is made to be fully surfaced) or placed outside the region to be filled by the powder so that the powder does not inadvertently become lodged and possibly eventually cured within a portion of the component. If solid, or even hollow, the component may be made from a material that can be removed from the cured mixture. This removal process may occur in a number of ways. For example, it may occur mechanically, by melting and flowing during a heating process, by reduction in hydrogen as may be used in a subsequent sintering or fusing step, by dissolving using an acid or solvent or dissociation through application of an acid or base, or the like. The component may be made of many different materials such as a thermoplastic, a cross-linked plastic, a low melting temperature metal, a tube made from a material with a melting temperature higher than that of used in any subsequent step, and the like. The component is preferably a thermoplastic material such as wax.

The component material may be rigid or flexible. If flexible, the component may be formed to a desired shape in a number of ways including bending by hand, with or without a bending fixture, or by use of a computer controlled bending device. If rigid, the component may be formed to a desired shape by laying segments of the material end to end or adjacent to one another. A supplemental material (such as molding wax) may be used to fill gaps and ensure adequate continuity between individual pieces of the component. Individual components may alternatively be bonded together by melting, partial dissolution, and contacting, or the like. The component may alternatively be produced as any other object of desired shape using various RP&M techniques such as stereolithography or selective deposition modeling as discussed previously.

Alternatively the component may be formed from a flowable material that is applied to the partially filled mold. This flowable material might include a hot-melt glue, other thermoplastic material, low melting temperature metal, thermojet material, or the like. The flowable material might be dispensed into paths, slots, groves, or indentations formed at desired locations in the powder material. Alternatively, the flowable material might be dispensed in such a manner that it roughly holds a desired shape. The dispensing might be controlled by hand or by a computer controlled dispensing device such as those used in the SDM technologies.

As noted above, the component may include a hollow element having any of various outer and inner cross-sectional configurations. This element may be elongated and the hollow portion may essentially run the length of this element. These hollow elements are generally referred herein as tubes regardless of their inner and outer cross-sectional configurations. The outer and inner cross-sectional configurations may be different on a single tube and components with different configurations may be used in forming a single tool. For example, one or both of the inner and outer shapes may include triangular, square, rectangular, diamond, hexagonal, circular, or elliptical structures.

If the component is a tube, it may remain as part of the tool. The tube may be formed from a number of materials. If the tube is to remain in the tool, it should be formed from a material having a higher melting point than any temperature used in the subsequent steps of forming the tool. The tool may be formed from any appropriate material such as copper, steel, stainless steal, and the like. It may be solid or braided. If the component is a solid, it may be removed during or after formation of the tool to reveal a passage or opening in the tool. The passage may be used as a fluid flow path and/or it may be used to locate some other thermal control element. Other thermal control elements might include things like heaters, cascades, spirals, blades, cooling pins, temperature sensors, and the like. Initially, the passage might be formed with the thermal control element in place. The passage might be initially formed by a combination of an element that will remain in the tool and one that will be removed. Such a combination might include one of the elements noted above for redirecting fluid flow where the element would be partially covered with a removable thermoplastic, thermoset, or solidified photoset material. This removal of material may be removed during one of the subsequent steps leaving the element in place with its flow path of desired shape surrounding it.

Figure 9A:
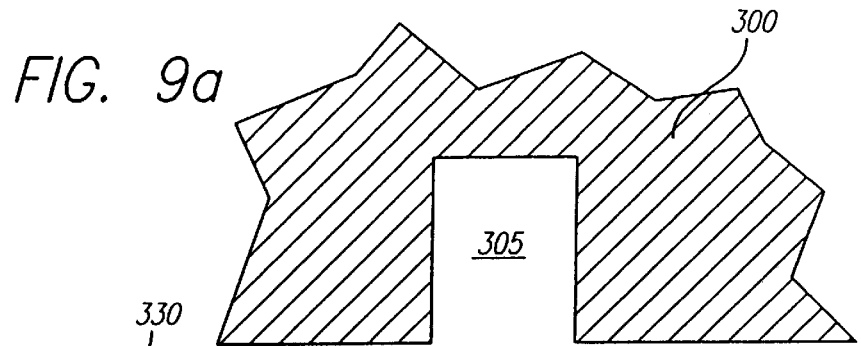
FIG. 9a depicts a side view of an intermediate mold containing a feature that will be a protrusion on the tool produced from the mold.

FIGS. 9a–9d illustrate some of the above alternatives as applied to locating a cascade in the tool. FIG. 9a depicts a side view of a portion of an intermediate mold 300 containing indentation 305.

Figure 9B:
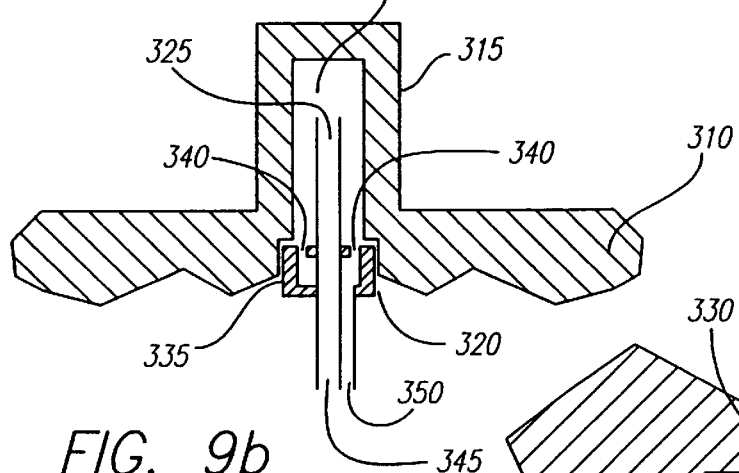
FIG. 9b depicts a tool formed from the intermediate cavity of FIG. 9a including a cascade inserted therein.

FIG. 9b depicts a side view of the tool 310 that is to be formed using intermediate mold. Feature 315 on the surface of tool 310 is produced from indentation 305 on mold 300. In the process of designing the tool, it was determined that this feature 315 should include a flow path for circulating a fluid. It was additionally determined, that this flow path should include a cascade 320.

A cascade is a device that typically directs a flow of fluid out of a center opening 325 into a region 330 that is to be cooled or heated by the flow. The base 335 of the cascade typically has one or more openings 340 to allow fluid to exit from the region 330. Tube 345 or an opening of some form typically supplies input fluid and a tube 345 or other exit configuration allows output flow. Cascades are typically located in regions which are to small to allow placement of separate input and out tubes.

In standard practice, cascades are typically located into position after the tool is formed. First, a hole or opening is machined from the back side of the tool to a depth that extends the hole to a desired position within the protrusion. Next a portion of the hole is threaded for accepting a complementary threaded structure on the cascade. FIG. 9c depicts an improved technique for inserting a cascade into the tool at a desired position. This improved technique simplifies the typical process in that a component 355, made from a removable material 370, is placed in a fill region 365 of intermediate mold 300. The powder material 360 that would otherwise occupy this position is displaced by the component to make room for the cascade 320 and supply a hollow interior region 330. In this alternative the component is removed during or after formation of the green part. After removal of the component, the desired cascade may be inserted into the vacated space.

In a further enhancement of this improved technique, it is possible that component 355 include a threaded region of appropriate size and position, to allow the cascade to be added into the vacated space without need for performing a separate threading step. Furthermore, in a variation of this technique, the component may only be of near net shape and size, such that some amount of machining may still be desirable but less than would otherwise be necessary.

Figure 9D:
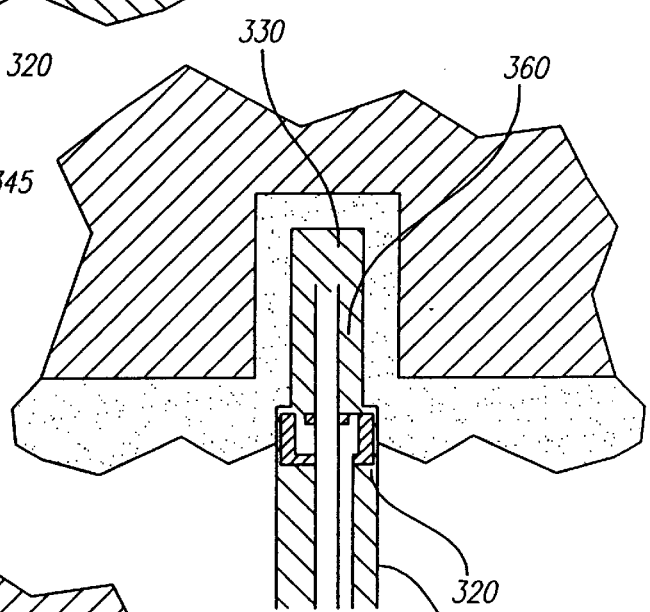
FIG. 9d depicts a mold of FIG. 9d having a component inserted therein along with a powder material, where the component includes a removable portion and a cascade.
Figure 9C:
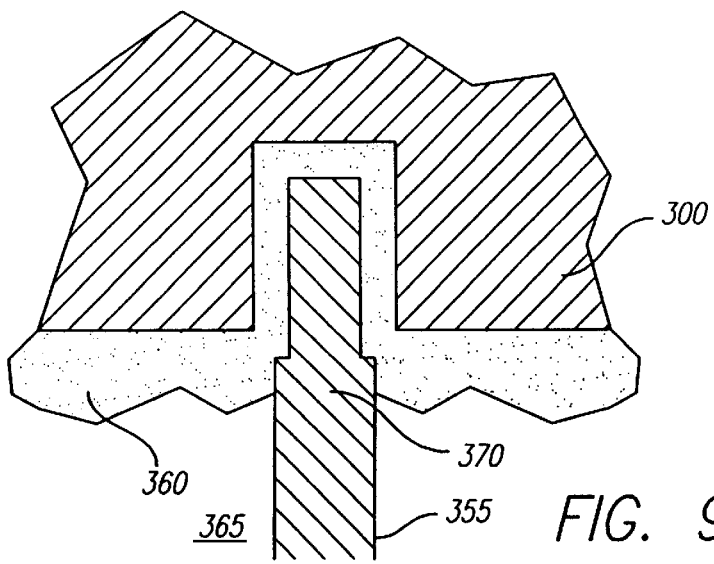
FIG. 9c depicts a mold of FIG. 9a having a removable component inserted therein along with a powder material.

FIG. 9d depicts a second improved technique for locating a cascade 320 within the tool. In this alternative, a component 355' is initially placed in the fill region 365 of intermediate mold 300. This component includes cascade 320. Furthermore, the component 355' also includes at least one section, composed of a removable material 360, that forms a coating over a portion of the cascade. In particular, it is preferred that this coating be sized and shaped appropriately to occupy at least region 330. After insertion of this component, filling is completed and the tool is solidified. During solidification or thereafter, material 360 is removed from the tool, leaving region 330 vacant and able to accept a fluid flow.

As an enhancement of this alternative, threads may exist on the base of the cascade. If the base of the cascade contacts the powder material when it is being solidified, whether or not threads are included thereon, the cascade may become integrally bonded to the primary material forming the tool. If threaded, a thin coating may separate the threaded region from the solidifying powder whereby integral bonding may be inhibited. In this technique, the cascade and any components inserted therein, are preferably made from a material that has a higher melting point that any temperatures used in processing the tool. For example, if the highest temperatures used in forming the tool are associated with melting and infiltrating the tool with copper, the cascade may be any material with a melting point sufficiently above the infiltration temperature. For example, the cascade may be formed from stainless steel or the like.

An enhancement of the above techniques for inserting flow passages into the tool, involves the insertion of output and input couplings in the components and integrally bonding these components to the powder material forming the bulk of the tool. These couplings/fittings might be attached near the ends of the components so that one end extends from the body of the tool while the other end is embedded in the body of the tool (and appropriately linked to a fluid flow path. The end that extends from the body of the powder material might be embedded in the material forming the intermediate mold. If hollow, these fittings/couplings may be filled or at least partially filled with a removable material to keep powder from entering therein.

In general, threaded components, removable or permanent, may be added to displace the powder material. These threaded components and/or regions left after removal of the components may be used for making any of various connections to the tool. These threaded components may be net-shape components or near net-shape components. The near net-shape components still might require some amount of threading before putting the tool to use but considerably less than what would otherwise be required. Removable components might be made from any of a variety of materials so long as they leave a threaded surface in the tool after their removal.

In other alternatives, the components may be inserted for other purposes than controlling the thermal properties of the tool. For example, net-shape or near net-shape passages may be inserted as ejection pin paths. These passages may be formed from hollow components or solid components. If the passages are formed in a near net-shape manner, reaming or other machining operations may be used to bring them to their required net configuration. The passages may be initially formed such that they come close to the molding surface of the tool but do not touch it. Alternatively, the passages may contact the surface.

These passages may be located in registered positions relative to the molding surface by mounting the rods on a fixture and placing the fixture at a desired location at the back side of the intermediate mold. The rods may be smooth or have texturing to help hold them in place. The fixture may include registration features or holes specific to the tool being formed. Alternatively, the fixture may comprise one or more plates with standardized arrays of holes or features located therein where the rods are inserted into only a selected group of these holes or features. A fixture may comprise multiple components that can be moved in along a plane of the fixture so as to frictionally lock the rods into a desired vertical position once initially set in that position. Many other alternatives for locating and locking the rods in desired locations in the fixture will be the apparent to those in the art.

The rods may take on any desired shape or multitude of shapes. The rods may be removable from the green part, or completed tool, through a property of their material that allows separation to occur. Alternatively, ability to separate may be achieved by coating the rods with a removable material such as a thin coating of wax. The positioning of these rods may also be useful in holding the other components in place during the formation process.

Other uses for components might involve formation of undercut regions that are desired to exist in one or more sides of a tool. A component may be added to displace the powder material in the undercut region. Once tool is ready to be removed from the mold, removal can be readily performed. Removal from the back side of the intermediate mold is not restricted by a blocking element of the mold. Without the use of the removable component, the ability to remove the tool from the mold would be hindered by the overlapping section of the mold that would have otherwise been required to form the undercut. An example of this is illustrated in FIGS. 10a and 10b.

Figure 10A:
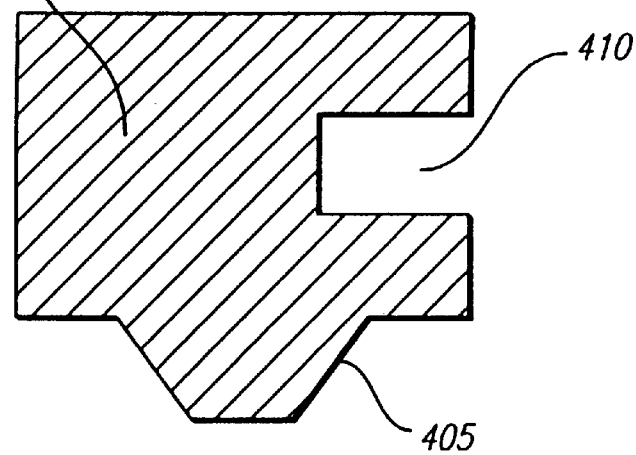
FIG. 10a depicts a tool with an undercut.
Figure 10B:
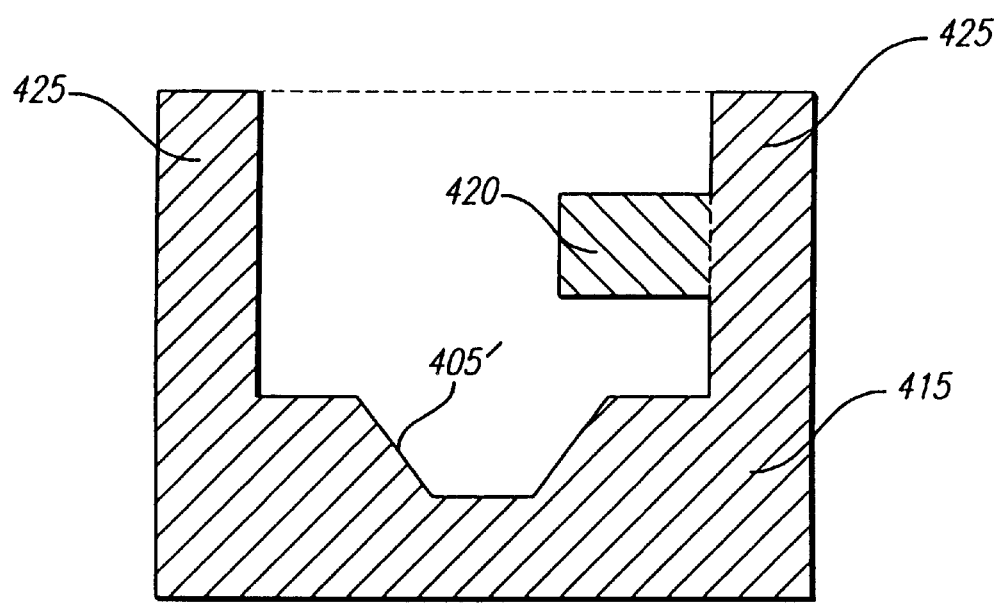
FIG. 10b depicts an intermediate mold for forming the tool of FIG. 10a including a removable portion for forming the undercut in the tool.

FIG. 10a depicts a tool 400 to be formed including molding surface 405 and undercut region 410. FIG. 10b depicts an intermediate mold 415 from which tool 400 is to be formed. Intermediate mold 400 includes molding surface 405', side structures 425, and undercut element 420. Undercut element 420 may be butted against side structure 425 or, alternatively, it may be fitted into a grove in side structure 425. In any event, an undercut element is a removable component of the mold and can be removed from the mold prior to, or along with, removal of the object from the mold. The undercut element may remain intact and may be removable by sliding it out of the mold along with the green tool. On the other hand it may be formed from a decomposable material such those mentioned elsewhere herein.

A component may also be used to form part of the molding surface. In particular, a component may be used as part of the molding surface where a feature has a high aspect ratio (height is significantly larger than width). Aspect ratios may become problematic when they become greater than about four. These features typically become deeply embedded in an indentation along the surface of the intermediate mold. These features can easily damaged or broken from the green part when attempting separation from the mold. If a mold surface in immediate vicinity to a feature of this type can be offset from its desired position, an easily removal component may be inserted. This easily removal component preferably has an inner surface configuration matching that of the desired molding surface and an outer surface configuration matching that of the offset mold surface. Components of this type can act to more easily release the green part and thus reduce damage to the tool surface being formed.

Flow paths formed from the components may take on various shapes by either having various cross-sectional configurations or by following various paths through the tool and beyond. They may be placed in a single plane below the molding surface of the tool. They may be uniformly spaced or non-uniformly spaced. They are typically located at or beyond a minimum distance from any area elements of the surface so as to not affect the integrity of the tool's surface. They may approximately trace the contour of the molding surface of the tool so as to provide approximately equal distance flow paths for heat transfer between the flow paths and the molding surface. Flow paths maintaining this approximately uniform spacing form the molding surface may be called conformal flow paths. They may be arranged so that one or more paths are conformal while others are not.

There are various ways that one might distinguish conformal from non-conformal flow paths. Some of these ways will be defined herein later. One such method might base a definition on all flow paths in the tool while another might simply focus on the conformal attributes of a single flow path. For example one might define a single flow path as conformal if the spacing along the majority of its length stays within a certain spacing range from the surface. This spacing range might be based on a deviation from a mean spacing value. For example the path may be considered conformal if the majority of the distances along the length of the flow path are within a factor range 0.5 to 2.0 of the mean value of the distances. Alternately the path may be considered conformal if the average values of the largest 10% and smallest 10% are within a certain factor of each other. For example, the factor may require that the larger average value be within 2, 3, or even 5 times the smaller average value. As noted in some alternatives, the above definitions may not be confined to a single flow path but instead be based on position of all flow paths relative to an associated molding surface of the tool.

These passages may have paths that enter and leave from opposite sides of the tool. A passage may form a loop within the body of the tool and enter and exit from the same or adjoining sides. A passage may primarily be located under the molding surface, primarily located around the perimeter of the molding surface, or located in a position that is a combination of the two. Paths that are located around the perimeter of the molding surface and enter and exit the tool from the same or adjoining sides of the tool are sometimes referred to as jackets (e.g. if water is the flowable medium, they may be called water jackets).

Each flow path may have its own inlet to the tool and/or its own outlet. Alternatively, multiple flow paths may share a single inlet and/or a single outlet. If sharing a single inlet, these multiple flow paths will typically diverge from at least some other flow paths sharing the inlet as they move deeper into the tool. Similarly multiple flow paths will typically converge as they approach the exiting side of the tool when they share a single outlet. These types of flow paths may be called manifolds. Flow paths in these manifolds may stay within a single plane or may travel along paths that are three-dimensional.

Step 4:

In this step, the material becomes sufficiently bonded to form a cohesive mass of sufficient strength to survive the remaining steps of the process. Any binder included in the material, whether initially powder or liquid, may be used to bond the remaining particles in the material together to form a cohesive mass.

This step may be executed independently of filling the mold or it may be possible for this step, at least in part, to occur as the mold is being filled.

A further alternative might start with a cast powder material (i.e. the powder material filling the mold) that completely lacks a binder or lacks a sufficient quantity of binder. This alternative utilizes a preliminary step of adding a binding agent to the cast powder material followed by a step of curing the binder.

This preliminary step might be accompanied by one or more applications of the binder material to some or all of the exposed surfaces of the cast powder. One or more applications of vacuum and air pressure may be used to aid the material in entering the interstitial spaces between the particles. Alternative or supplemental approaches might tailor the surface energy of the binder to that of the particles such that capillary action will aid in transporting the binder into the interstitial spaces. Other alternatives might apply vibrational energy or centrifugal forces to aid in driving the binder into the interstitial spaces. Other alternatives may simply use excess air pressure applied to all or part of the exposed surfaces, simultaneously or in steps, to drive the binder into the spaces.

An implementation of this preliminary step might involve, evacuating the air that surrounds the mold and most importantly the air that exists within the interstitial spaces between the powder particles. After reasonable evacuation, an excess thickness of binder may be added to all exposed surfaces of the powder material. After the coating process the vacuum is released to let standard or excess air pressure impinge on the coated surface. Preferably the coating process ensures that no entry points for air exist around the mold, thus ensuring that the air will drive the binder into the interstitial spaces between the particles. It is hoped that this process will drive a sufficient quantity of binder into the interstitial spaces to allow adequate binding of the powder material together.

After filling is complete, excess binder may be optionally removed from the exposed surfaces. The binder may then be cured by application of appropriate stimulation (e.g. heat), or removal of elevated temperature that may have been necessary to liquefy the binder in the first place. The binder may have been activated, or initiated, prior to its application to the exposed surface so that after filling the binder begins to set, cure, or solidify on it own. In this alternative it may be desirable to leave the mold in place until after sintering is complete.

In a further alternative, this step may be executed, at least in part, simultaneously with sintering of the remaining powder particles in the material. In this alternative, the step of separating the mold and the green part prior to sintering may be eliminated, occur simultaneously with sintering, or occur at least in part after sintering is complete.

In a further alternative, this step may be eliminated in favor of directly sintering the particles wherein it is preferred that the mold continue to support the cast powder during at least the initial stages of sintering.

Step 5:

In this step the green part, if formed, is separated from the intermediate mold. If the mold is RTV, this step may be accomplished by flexing the RTV mold to release the green part. It is preferred that the binder, if used, be completely cured prior to executing this step.

If the mold is made from a thermoset or photoset material such as that used in the formation of a stereolithographically produced object, separation may occur by heating the stereolithography object to (approximately) its glass transition temperature (or above) whereafter the mold may be flexed sufficiently to release the green part. Alternatively the mold may be acted on by a solvent, which has little or no effect on the green part, in order to soften or dissolve the mold sufficiently to allow separation.

Alternatively as noted previously, especially if a green part is not formed, the mold may be allowed to support the object during at least the initial phases of the firing process so that sufficient sintering, or other bonding, might occur. The mold may be burned away during firing, reduced by hydrogen during firing, or simply removed after firing so long as the mold and sintered article remain separable.

Step 6:

In this step the green part is heated in a furnace to sinter or otherwise integrally bond the powder particles together. This step results in the formation of a fired part. If a binder exists in the green part, the binder is preferably removed during this step as well. After the sintering process, the object is typically not 100% dense and thus an infiltrating step typically follows. In an alternative, the object density resulting from this step may be at or close to 100% such that the infiltration step may be eliminated.

Step 7:

In this step the fired part is typically heated in another furnace cycle where it is in contact with an infiltrant that has a lower melting temperature than remaining component particles in the powder material. After this step the fired part may be considered an infiltrated part and its surface corresponding to the previously mentioned first, second, third surfaces may be considered the preliminary molding surface. This infiltrant typically serves two primary functions: (1) bring the fired part to full density, and (2) increase the strength of the part. Infiltrants may be any of a variety of materials including single component metals, (e.g. copper), alloys of various metals, (e.g. bronze, brass or beryllium copper).

In an alternative, the firing of step 6 and the infiltration of step 7 may occur in a combined heating step.

In a further alternative, this step may be eliminated as the fired part may be used for its intended purpose (e.g. as a tool) without being infiltrated.

Step 8:

In this step, the passages defined by the at least one component are opened and cleaned out. This step may involve a minor amount of machining to open closed or partially closed passages. Any remaining components or component material might be removed in a variety of ways. Air pressure might be utilized to force out any residual pieces of the original components. High-pressure fluid such as water or a solvent may be used to attack, destroy and remove any remaining components.

A further heating process may be used to burn out any remaining components that may not have been completely eliminated. In this further heating process, it is preferred that the temperature remain below that used in the infiltration process.

Some or all of these passages may have been opened and cleaned out as a result of either of the two firing steps discussed previously. In the case that all passages are already cleared, this will not be an independently performed step and the process will proceed to the next step.

As noted previously, these passages may be used in a number of ways. They might be used in forming thermal control elements, for insertion of ejection pins, for insertion of other mold components, or the like. Preferred thermal control elements and functions may be classified as active, enhanced, or both. The active functions are those where heat is actively withdrawn or added at some point in the passage. To achieve an active functionality, particular elements may need to be added to or in the passages. Enhanced thermal control functions work in more passive ways but offer different thermal control characteristics than found in the infiltrated material that the tool is primarily formed from. To achieve an enhanced function, particular elements may need to be added to or in the passages.

The adding of elements to a passage may be based on tests such as measurements of temperature. Tests may be performed with no thermal control elements in use in the passage other than the effect of its own hollow nature. If the temperature or other thermal properties of the molding surface are found to be unacceptable, appropriate elements or functionality may be added to the passage.

A first example of active thermal control functions and elements include fluid flow (e.g. water or oil), fluid flow paths (e.g. passages for water or oil) and fluid flow modification elements. Passages used as flow paths may have various elements inserted in them so that flow paths with desired properties can be attained. These elements include items such as cascades, blades, spiraling inserts, and the like known to those of skill in the art.

Heating and heaters are a second example of active thermal control functions and elements (e.g. resistive or inductive electrical heaters that add heat to the system and then transfer it by conduction, convection or radiation rigid or flexible cartridge heaters).

A first example of an enhanced thermal control element is a hollow passage (may have low thermal conductivity compared to the infiltrated material). Additional examples include cooling and heating pins, blades, or blocks that have higher thermal conductivity than the infiltrated material. One end or surface of these elements might contact the region that will have its temperature controlled or managed while the other end may be in contact with or immersed in a thermal reservoir so as that heat may be transferred in a proper direction along the element. Additional examples include heat trapping pins, blades, or blocks that are made from a material with lower thermal conductivity than the surrounding infiltrated material so as to limit heat transfer to or away from a region.

Other elements may be inserted into the passages to enhance thermal control. Some of these elements may be looked at as either active or enhanced. For example, heat pipes may be used which include a trapped fluid, which conducts heat at enhanced rates by means of convection currents or the like within the tube.

Other elements include single or multiple temperature sensors that can be used in monitoring and characterizing the thermal configuration of the tool during setup or operation. In some alternatives, the sensors may be connected to appropriate control circuitry and systems to allow modification of parameters controlling the active elements, so as to allow the tool to operate in an optimal range for a given process and molding material and/or operate with the adequate temperature uniformity across the molding surfaces. The information obtained from these sensors may be used for parameter control during set up, molding operation, or both. Alternatively, the sensors may be used for observation purposes only or to aid in manually controlling parameters.

A tool may be formed with two or more temperature sensors and two or more flow paths. In response to the sensed temperature, the flow amount in at least one of the flow passages may be adjusted. This adjustment may be based on a desire to improve temperature uniformity along the mold surface and/or to bring the average mold temperature to a more desirable level.

Step 9:

Various additional steps may be taken in finishing the tool. The surface of the tool may be further shaped by hand or by using various machining operations such as an EDM process or the like to cause the molding surface to take its final shape. Various fluid flow components may be added to the passages. Heating elements may be inserted and electrical connections may be made to those elements. Temperature sensors might be inserted and appropriately coupled to the tool such as with thermal pastes or the like. The portion of the tool formed according to the steps described herein may be combined with other tools or tooling elements formed in similar or different ways and connected to one or more bases or other mounting systems. These bases or other mounting systems might include passages for various purposes, such as cooling lines, and as such may themselves be formed according to the teachings herein.

Various alternatives exist to the performing some or all of the above tasks in association with this step. For example, it may be possible to add some or all flow control elements, heaters and temperature sensors during some of the earlier steps such as at the time of filling the intermediate mold with powder, before firing, before infiltration and the like.

For example, further finishing steps may involve modifications or additions to passages so as to prepare them for their intended use as active or enhanced thermal control elements. If they are to be fluid flow paths, fittings, plugs, or the like, may be added to portions of the pathways to form entry zones, exit zones, and blocked passages. Other fluid flow elements may be added to the passages to obtain modified flow characteristics. These elements might include flow diverting or directing elements such as cascades, blades, spiraling inserts, and the like known to those of skill in the art. If they are to be used in the process of actively heating the tool, heating elements such as electrical heaters may be inserted in the passages. If they are to be actively used as temperature measuring regions, temperature sensors may be inserted into the passages. If they are too be used in an enhanced thermal control process, solid or fluid containing elements may be inserted into the passages which have different thermal properties than that of the surrounding infiltrated powder matrix. These enhanced thermal control elements may have higher thermal conductivity or lower thermal conductivity than the surrounding infiltrated matrix. These elements may include such things as heating pins, cooling pins, heat pipes, etc.

Step 10:

Once the tool is completed it may be put to use in an application of choice. As a first example, the tool may be used in a molding method to make multiple copies of an object. This method might include the steps of:

(a) Providing a molding material in a flowable state. This molding material might be a metal that will be die cast such as zinc, aluminum, magnesium or it might be a plastic material that will be injection molded such as ABS, Nylon, polycarbonate, glass filled polycarbonate, polyethylene, polystyrene, etc.

(b) Inserting or injecting the provided material into a cavity having a desired shape which corresponds to the shape of the object to be formed. The cavity in which material is injected may include two or more surfaces, some of which are indented and some of which are protruding. Upon injection it is desired that the material and mold have appropriate temperatures and thermal characteristics so that the cavity may be entirely filled before passages within the cavity become blocked with solidified or solidifying material. To ensure that complete filling occurs, it is common to inject the materials with high pressure so that all required material can enter the cavity prior to significant solidification occurring.

(c) After insertion of the material, it is solidified to form a copy of the object within the mold cavity. Substantial, if not complete, solidification of the object occurs preferably before attempting to open the mold and remove the object therefrom. If substantial solidification has not occurred before the mold is opened, the object will deviate from its desired shape as material continues to flow. Furthermore, any ejection pins that are used to remove the object, typically form a protruding side of the mold, may excessively damage the object if not sufficiently being formed.

(d) After solidification, the cavity is opened and the object is removed from the mold. It is common for the object to cling to the protruding side of the mold upon opening. It is also typical to have ejector pins, air pressure or the like used to disengage the object from the mold.

(e) After ejection of the object, the mold is closed again in preparation for forming a next object. Prior to closing the mold, the molding surface may be treated with a release agent to aid in disengaging the object after formation.

(f) After formation of the first object, steps (b)–(e) are typically repeated a plurality of times to form the desired quantity of objects.

In the above process it is desirable that the cycle time (time to complete steps (b)–(e) a single time) be as small as possible so that throughput on a given system may be maximized. Minimization of cycle time requires rapid solidification of the molding material after injection, which in turn requires rapid heat removal from the tool. However, if the mold temperature is too low or heat removal from the molding material is not uniform, the mold might not fill completely, the object may be distorted upon ejection, and/or the surface finish of the object may be degraded. Furthermore, if a cavity has thick and thin sections (i.e. the produced object will have thick and thin sections), uniform heat withdrawal across the molding surfaces may not be appropriate. It may be more appropriate to a have higher rate of heat withdrawal from the thicker object regions than the thinner regions so that solidification of the material is as uniform as possible.

As such the present invention can be utilized in improving the above process by providing more effective thermal control than typically used. The thermal control elements contemplated by some aspects of this invention, e.g. fluid flow passages, may be formed to more uniformly track the molding surface and thus be used to more uniformly extract heat from that surface. In some embodiments where conformal flow passage placement is sought (i.e. flow passage position tracking molding surface), it is preferred that a majority of the distances between surface elements and nearest points on the nearest flow paths (i.e. minimum distances) be maintained within +100% and 50% of a mean value of the minimum distances. It is more preferred that 75% of all distances meet this criteria, and it is even more preferred that 90% of the all distances meet this criteria. For example, in a preferred situation the mean distance between surface elements and nearest flow paths may be 0.50 inches, resulting in the majority of all such minimum distances falling within approximately 1.0 inches and 0.25 inches. If the mean value of minimum distances is 0.125 inches, then a majority of all such distances will fall within approximately 0.250 inches and approximately 0.060 inches. If the mean distance is 0.062 inches then the majority of all such distances will be between approximately 0.125 inches and 0.030 inches.

In practicing some conformal flow path techniques, it is anticipated that not all portions of all flow paths will follow paths that are coplanar with all other flow paths. In other words, the flow paths will be oriented such that various portions of each flow path in the tool will define a plurality of planes. In some circumstances, it is anticipated that at least one flow path will follow at least a two-dimensional flow path through the tool, while in other circumstances at least one flow path will follow a three-dimensional path.

More particularly, in some situations it is anticipated that the plurality of planes of the two and the three-dimensional flow paths will be defined within a single otherwise solid piece of the tool.

In other preferred embodiments it is anticipated that multiple flow paths will be connected to a single input and output line within the body of the tool. It is further anticipated that at least one of these paths will have a two or three-dimensional structure which differs from that of at least one other line.

In some embodiments it is preferred that a majority of the distances separating surface elements from closest portions of flow paths lie between about 0.03 inches and 1.0 inches, and it is even more preferred that 90% of the distances meet this criteria. In other embodiments, it is preferred that a majority of the distances separating surface elements from closest portions of flow paths lie between about 0.03 inches and 0.5 inches, and it is even more preferred that 90% of the distances meet this criteria.

In other embodiments it is preferred that the minimum distance separating a surface region from a nearest portion of a nearest flow path be a predefined distance. It is preferred that the predefined distance be no less than 0.02 mils, and it is more preferred that the distance be no less than 0.08 inches In still other embodiments it is preferred that the thermal control elements operate to maintain 90% of all surface elements within a temperature range of about 5° C. during a set up stage. It is even more preferred that the thermal control elements operate to maintain 90% of all surface elements within a temperature range of about 3° C. during a set up stage. It is most preferred that all surface elements be maintained within the above noted ranges. In still other preferred embodiments, the above temperature criteria are achieved prior to injecting further flowable material into the mold to form a next copy of the object.

As an example of a second application, the tool may form part of a molding apparatus, which is used to form multiple copies of an object. This type of apparatus preferably includes a number of interacting elements: A heater is included for maintaining a molding material in a flowable state. A cavity of desired shape is included having at least two separable elements, the shape corresponding substantially to a shape of the object to be formed. The cavity is maintained in a condition to solidify the molding material. An injector system is included for inserting the flowable molding material into the cavity. An actuator is included which is operable to (1) separate the at least two elements of the cavity after the copy of the object has solidified sufficiently to retain its shape and to remove the object from the elements; and (2) merge the elements of the cavity, after removing the copy of the object, in preparation for forming a next copy of the object. Additionally, a control system is included for repeatedly operating the injector and actuator a plurality of times.

In an alternative embodiment, a tool including flow passages may be formed using spray molding or other deposition molding techniques (preferably spray metal forming techniques) where the sprayed or otherwise deposited material is applied to a molding surface to build up a tool from the deposited material. As with the first embodiment above, a component may be placed in a desired position relative to an initial surface, either before or after beginning deposition of material. After material deposition has substantially or completely embedded the component, or even more preferably after deposition is completed, the component is preferably removed leaving a flow passage within the deposited material. In an alternative, the component or a portion of the component may remain embedded if the component is a heating element, flow path divertor, a cooling pipe, a heat tube, or the like.

Though the above embodiments have been primarily concerned with the formation of tools with passages formed therein, it should be understood that these so called tools may not be used as tools at all but instead may be used as objects for any desired purpose. The passages or hollow regions formed in these objects during their formation may also be used for any desired purpose. The passages may simply be formed in the objects to make the objects lighter to save cost on materials used in the formation of the object, and the like.

Though particular alternatives have been presented herein in various combinations with one another, it should be understood that many of these alternatives may be practiced alone or in other combinations than specifically presented.

As many additional embodiments of and applications for the teachings herein will be readily apparent to those of skill in the art upon review of these teachings, it is intended that the invention not be limited by the disclosure herein above but be limited only by the claims presented hereafter.

We claim:

1. A method of forming a tool from a flowable material, the tool having a mold surface and at least one thermal control element for providing conformal cooling or heating for the tool, the method comprising the steps of:

supplying a master pattern formed from a first material, the master pattern having a first surface to be replicated;

locating the thermal control element at a position adjacent the first surface of the master pattern;

placing the flowable material adjacent the first surface and at least partially embedding the thermal control element in the flowable material; and solidifying the flowable material to form the tool, wherein the mold surface substantially replicates the first surface and the thermal control element establishes a conformal flow path within the tool.

2. The method of claim 1 wherein the thermal control element resides within a protrusion on the tool, the protrusion having an outer surface residing on the mold surface.

3. The method of claim 2 wherein the conformal flow path comprises a single inlet passageway for directing a stream of cooling or heating fluid to travel.

4. The method of claim 3 wherein the thermal control element is a cascade adapted for simultaneously directing a flow of fluid both into and out of the conformal flow path of the tool.

5. The method of claim 4 wherein a temporary component made from a removable material is used in locating the cascade adjacent the first surface of the master pattern.

6. The method of claim 5 wherein the temporary component is attached to the cascade and the conformal flow path of the tool is formed around the temporary component when the flowable material is placed into the master pattern.

7. The method of claim 6 further comprising the step of removing the temporary component to reveal a hollow interior region adjacent the cascade establishing the conformal flow path.

8. The method of claim 7 wherein the temporary component is removed by heating the tool to cause the temporary component to melt out of the tool.

9. The method of claim 8 wherein the temporary component is made by stereolithography or selective deposition modeling.

10. The method of claim 9 wherein the temporary component is made from a thermoplastic material.

11. The method of claim 10 wherein the flowable material is a mixture of a powder material and a binder.

12. The method of claim 11 wherein the powder material includes a metal powder.

13. The method of claim 12 wherein the powder material includes a ceramic powder.

14. The method of claim 11 wherein the powder material includes a ceramic powder.

* * * * *